(12) United States Patent
Yanagisawa

(10) Patent No.: US 11,537,031 B2
(45) Date of Patent: Dec. 27, 2022

(54) OPTICAL SYSTEM, PROJECTOR, AND IMAGING APPARATUS

(71) Applicant: SEIKO EPSON CORPORATION, Tokyo (JP)

(72) Inventor: Hirotaka Yanagisawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/461,660

(22) Filed: Aug. 30, 2021

(65) Prior Publication Data
US 2022/0066296 A1 Mar. 3, 2022

(30) Foreign Application Priority Data

Aug. 31, 2020 (JP) ............................. JP2020-145438

(51) Int. Cl.
*G03B 21/28* (2006.01)
*G02B 17/08* (2006.01)
*G03B 21/00* (2006.01)
*G02B 13/16* (2006.01)
*G03B 21/20* (2006.01)
*G03B 21/56* (2006.01)

(52) U.S. Cl.
CPC ............ *G03B 21/006* (2013.01); *G02B 13/16* (2013.01); *G02B 17/086* (2013.01); *G03B 21/2066* (2013.01); *G03B 21/28* (2013.01); *G03B 21/567* (2013.01)

(58) Field of Classification Search
CPC ........ G03B 21/28; G02B 13/16; G02B 17/08; G02B 17/086
See application file for complete search history.

(56) References Cited

U.S. PATENT DOCUMENTS

| | | | |
|---|---|---|---|
| 7,048,388 B2 | 5/2006 | Takaura et al. |
| 7,549,755 B2 | 6/2009 | Suzuki |
| 9,946,144 B2 | 4/2018 | Abe et al. |
| 2004/0156117 A1 | 8/2004 | Takaura et al. |
| 2006/0193036 A1 | 8/2006 | Suzuki |
| 2010/0157421 A1 | 6/2010 | Abe et al. |
| 2019/0011684 A1 | 1/2019 | Ishihara et al. |
| 2021/0033829 A1 | 2/2021 | Ishigame |

FOREIGN PATENT DOCUMENTS

| | | | |
|---|---|---|---|
| JP | 2004-246042 A | 9/2004 |
| JP | 2006-235516 A | 9/2006 |
| JP | 2007-316674 A | 12/2007 |
| JP | 5030732 B2 | 9/2012 |
| JP | 2017-156712 A | 9/2017 |
| JP | 2017-156713 A | 9/2017 |
| JP | 2017-156714 A | 9/2017 |
| JP | 2019-133061 A | 8/2019 |
| JP | 2020-042103 A | 3/2020 |
| JP | 2020-194115 A | 12/2020 |

*Primary Examiner* — Ryan D Howard
(74) *Attorney, Agent, or Firm* — Oliff PLC

(57) ABSTRACT

An optical system includes a lens having a first transmission surface, a reflection surface disposed on an enlargement side of the first transmission surface, and a second transmission surface disposed on the enlargement side of the reflection surface. The lens is made of resin. The reflection surface has a concave shape. A conditional expression below is satisfied, $$10 \leq q \times Fno/f^2 \leq 2989$$

where Fno is an F-number of the optical system, f is a focal length of the optical system, and q is an amount of light in an enlargement-side conjugate plane.

10 Claims, 18 Drawing Sheets

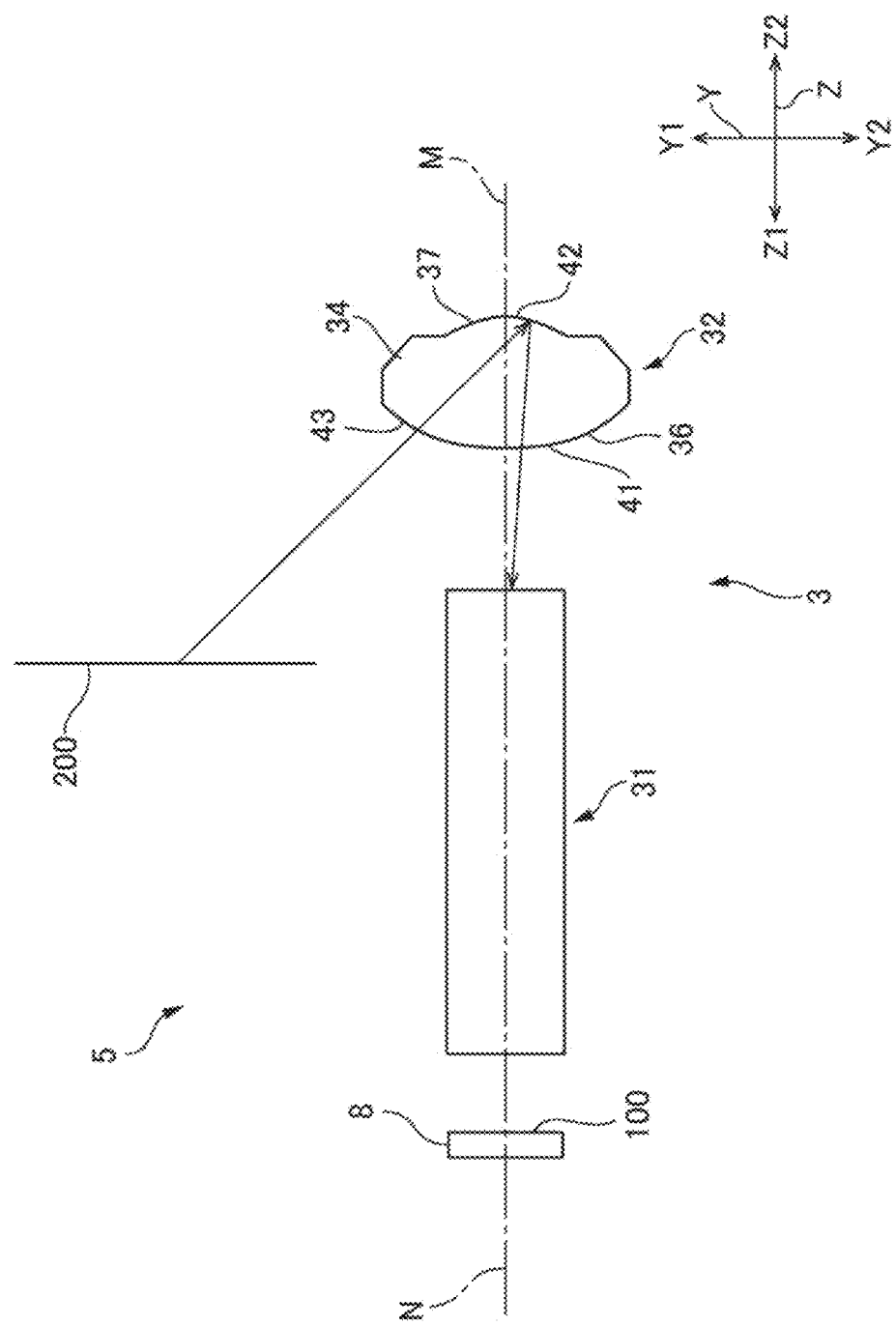

OPTICAL SYSTEM, PROJECTOR, AND IMAGING APPARATUS

The present application is based on, and claims priority from JP Application Serial Number 2020-145438, filed Aug. 31, 2020, the disclosure of which is hereby incorporated by reference herein in its entirety.

BACKGROUND

1. Technical Field

The present disclosure relates to an optical system, a projector, and an imaging apparatus.

2. Related Art

JP-A-2019-133061 describes a projector that magnifies and projects via a projection system a projection image formed by an image formation section. The projection system described in JP-A-2019-133061 is formed of a first optical system and a second optical system sequentially arranged from the reduction side toward the enlargement side. The first optical system is a refractive optical system including a plurality of lenses. The second optical system is a single optical element. The optical element is made of an optical material, such as glass or plastic. The optical element has a light incident surface, a reflection surface, and a light exiting surface sequentially arranged from the reduction side toward the enlargement side. The reflection surface has a concave shape. Beams having entered the optical element via the light incident surface are deflected back by the reflection surface and travel through the interior of the optical element toward the light exiting surface.

In the technology disclosed in JP-A-2019-133061, the beams having entered the optical element are deflected back by the concave reflection surface toward the interior of the optical element. A high optical density region is therefore formed in the optical element. When a high optical density region is formed in the optical element, the temperature in the region rises. The rise in temperature in the optical element changes the optical properties of the optical element in some cases.

An optical element made of glass excels in heat resistance as compared with an optical element made of resin. Using an optical element made of glass can therefore prevent the optical element from expanding or melting due to the rise in temperature. Changes in the optical properties of the optical element can therefore be suppressed. An optical element made of glass is, however, heavy as compared with an optical element made of resin. Furthermore, when optical elements having the same shape are manufactured, the manufacturing cost of optical elements made of glass is higher than that of optical elements made of resin in many cases.

SUMMARY

To solve the problems described above, an optical system according to an aspect of the present disclosure includes a lens having a first transmission surface, a reflection surface disposed on an enlargement side of the first transmission surface, and a second transmission surface disposed on the enlargement side of the reflection surface. The lens is made of resin. The reflection surface has a concave shape. A conditional expression below is satisfied, $$10 \leq q \times Fno/f^2 \leq 2989$$

where Fno is an F-number of the optical system, f is a focal length of the optical system, and q is an amount of light in an enlargement-side conjugate plane.

A projector according to another aspect of the present disclosure includes a light modulator that modulates light emitted from a light source and the optical system described above that projects the light modulated by the light modulator.

A projector according to another aspect of the present disclosure includes a self-luminous image display device that emits light to form an image and the optical system described above that projects the image formed by the self-luminous image display device.

An imaging apparatus according to another aspect of the present disclosure includes the optical system described above and an imager disposed in a reduction-side conjugate plane where light emitted from the optical system is imaged.

BRIEF DESCRIPTION OF THE DRAWINGS

FIG. 3 is viewed in the vertical direction.

FIG. 18 is a descriptive diagram of an imaging apparatus including the optical system according to the present disclosure.

DESCRIPTION OF EXEMPLARY EMBODIMENTS

An optical system and a projector according to an embodiment of the present disclosure will be described below with reference to the drawings.

Projector

Figure 1:
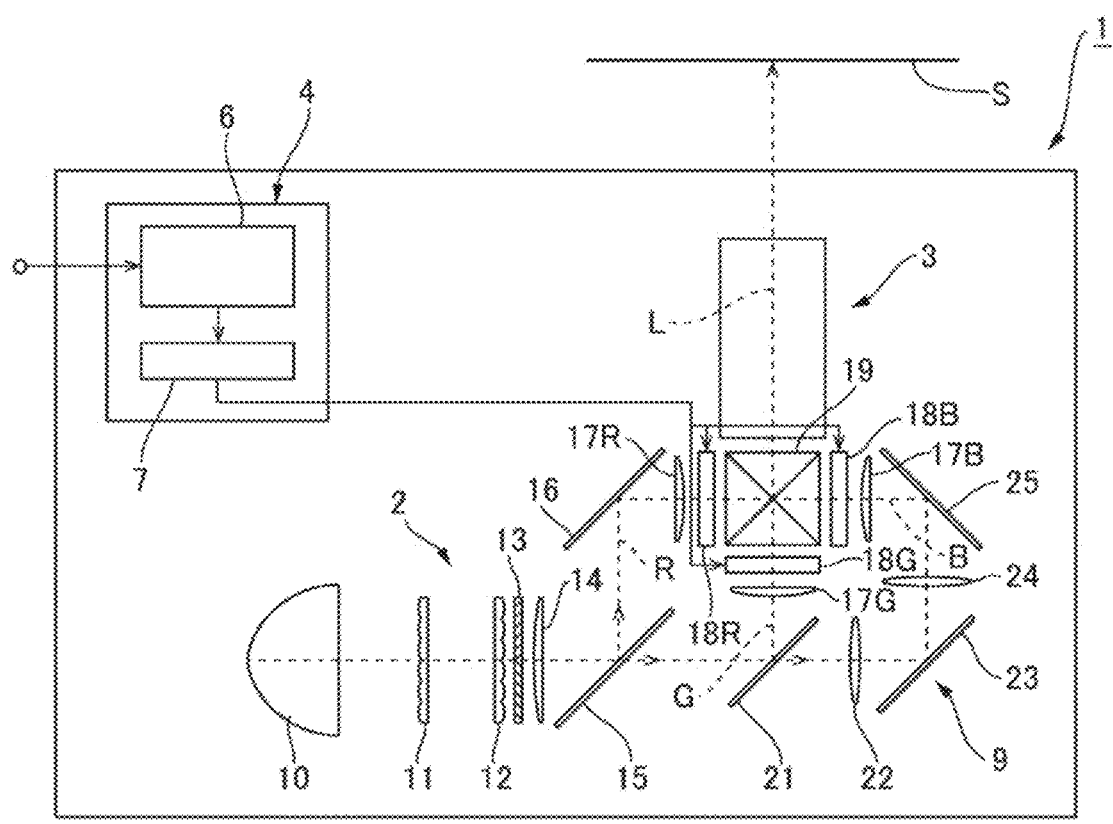
FIG. 1 is a schematic configuration diagram of a projector including an optical system according to the present disclosure.

FIG. 1 is a schematic configuration diagram of a projector including an optical system 3 according to the present disclosure. A projector 1 includes an image formation section 2, which generates a projection image to be projected on a screen S, the optical system 3, which magnifies the projection image and projects the magnified image on the screen S, and a controller 4, which controls the operation of the image formation section 2, as shown in FIG. 1.

Image Formation Section and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the luminous flux from the light source 10 into a plurality of luminous fluxes. The lens elements of the first optical integration lens 11 focus the luminous flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the beams incident via the superimposing lens 14, and transmits G light and B light, which are part of the beams incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the beams via the first dichroic mirror 15, and transmits the B light, which is part of the beams via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image display element. The liquid crystal panel 18B modulates the B light in accordance with an image signal to form a blue projection image.

The liquid crystal panels 18R, 18G, and 18B surround the cross dichroic prism 19 in such away that the liquid crystal panels 18R, 18G, and 18B face three sides of the cross dichroic prism 19. The cross dichroic prism 19 is a prism for light combination and generates a projection image that is the combination of the light modulated by the liquid crystal panel 18R, the light modulated by the liquid crystal panel 18G, and the light modulated by the liquid crystal panel 18B.

The optical system 3 magnifies and projects the combined projection image from the cross dichroic prism 19 on the screen S. The screen S is the enlargement-side conjugate plane of the optical system 3. The optical parts ranging from the light source 10 to the liquid crystal panels 18R, 18G, and 18B form an image formation optical system 9.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color projection image signals outputted from the image processor 6. The image processor 6 thus display projection images corresponding to the image signals on the liquid crystal panels 18R, 18G, and 18B.

Optical System

Examples 1 and 2 will next be described as examples of the configuration of the optical system 3 incorporated in the projector 1. In the beam diagrams of the optical systems according to Examples 1 and 2, the liquid crystal panels 18R, 18G, and 18B are referred to as liquid crystal panels 18.

Example 1

Figure 2:
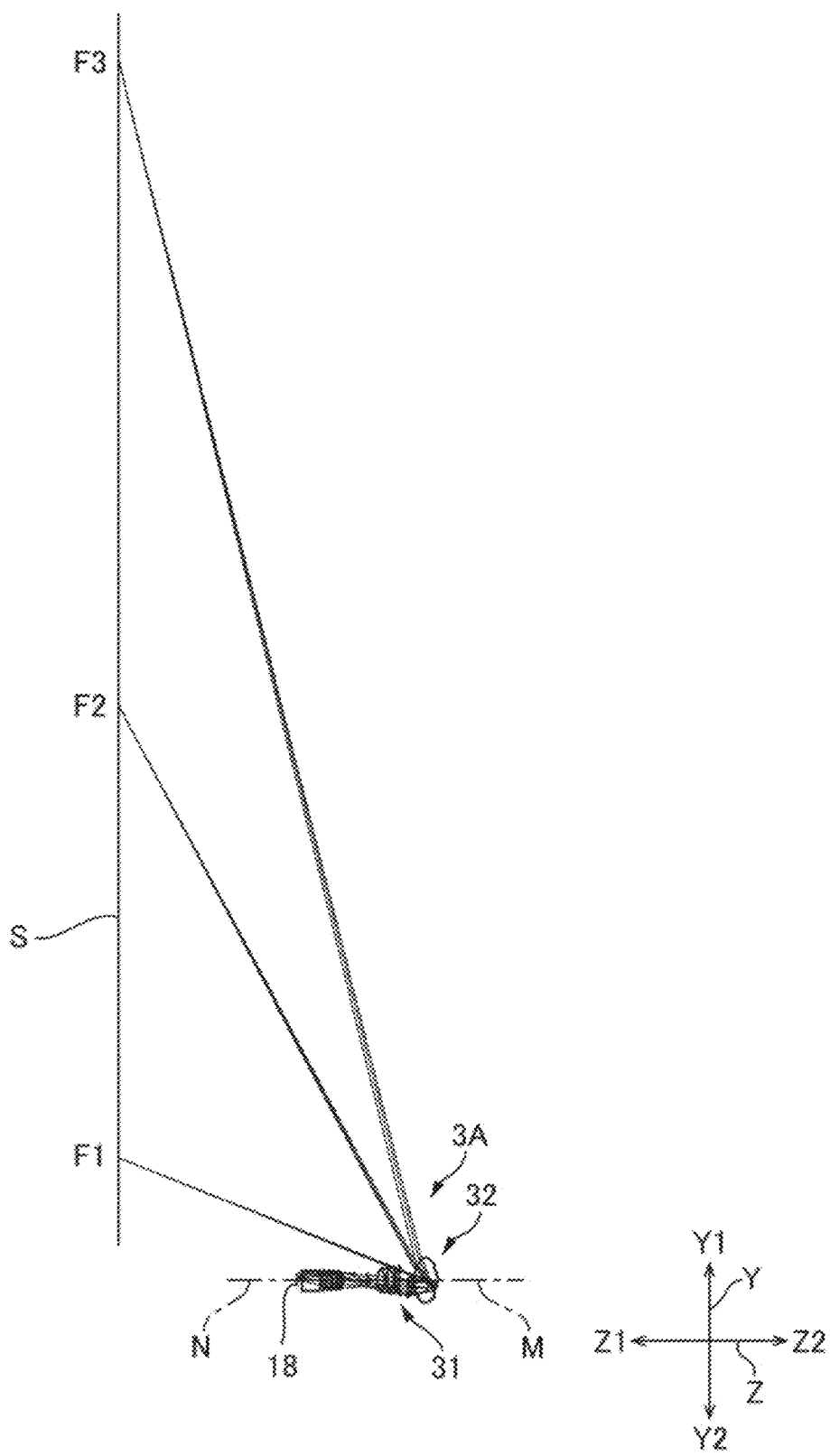
FIG. 2 is a beam diagram diagrammatically showing the entire optical system according to Example 1.
Figure 3:
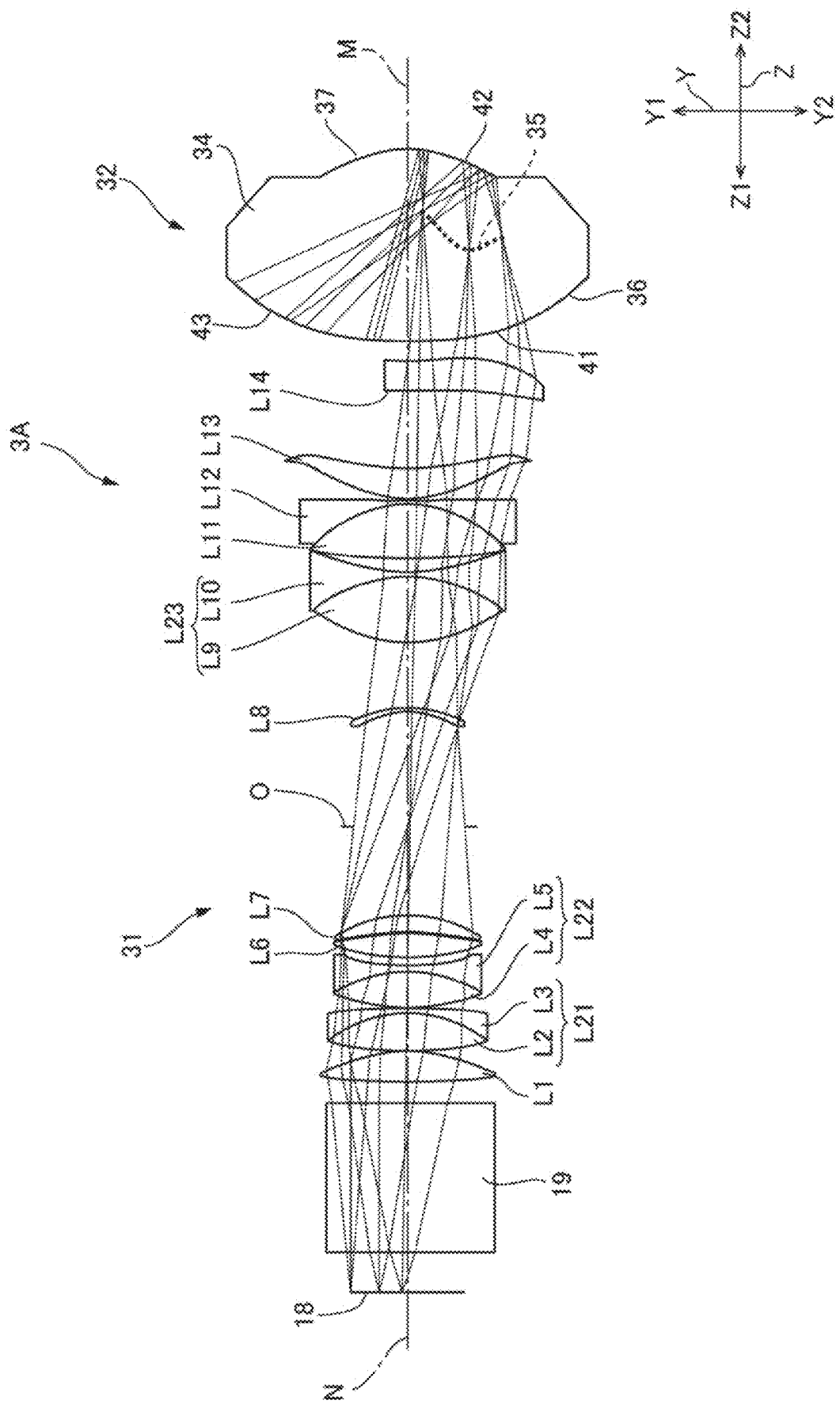
FIG. 3 is a beam diagram of the optical system according to Example 1.
Figure 4:
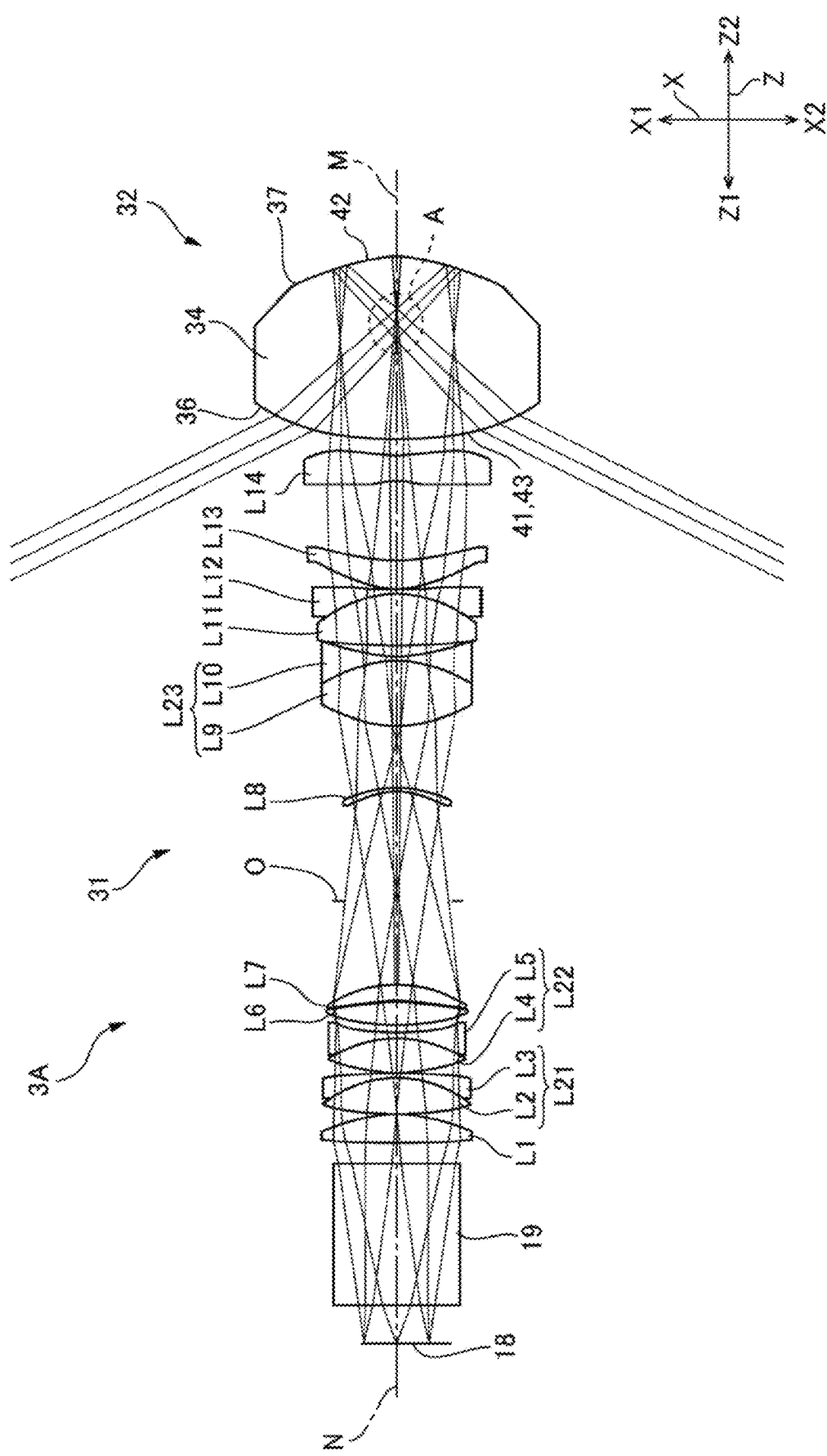
FIG. 4 is a beam diagram of the optical system according to Example 1 in a case where
Figure 5:
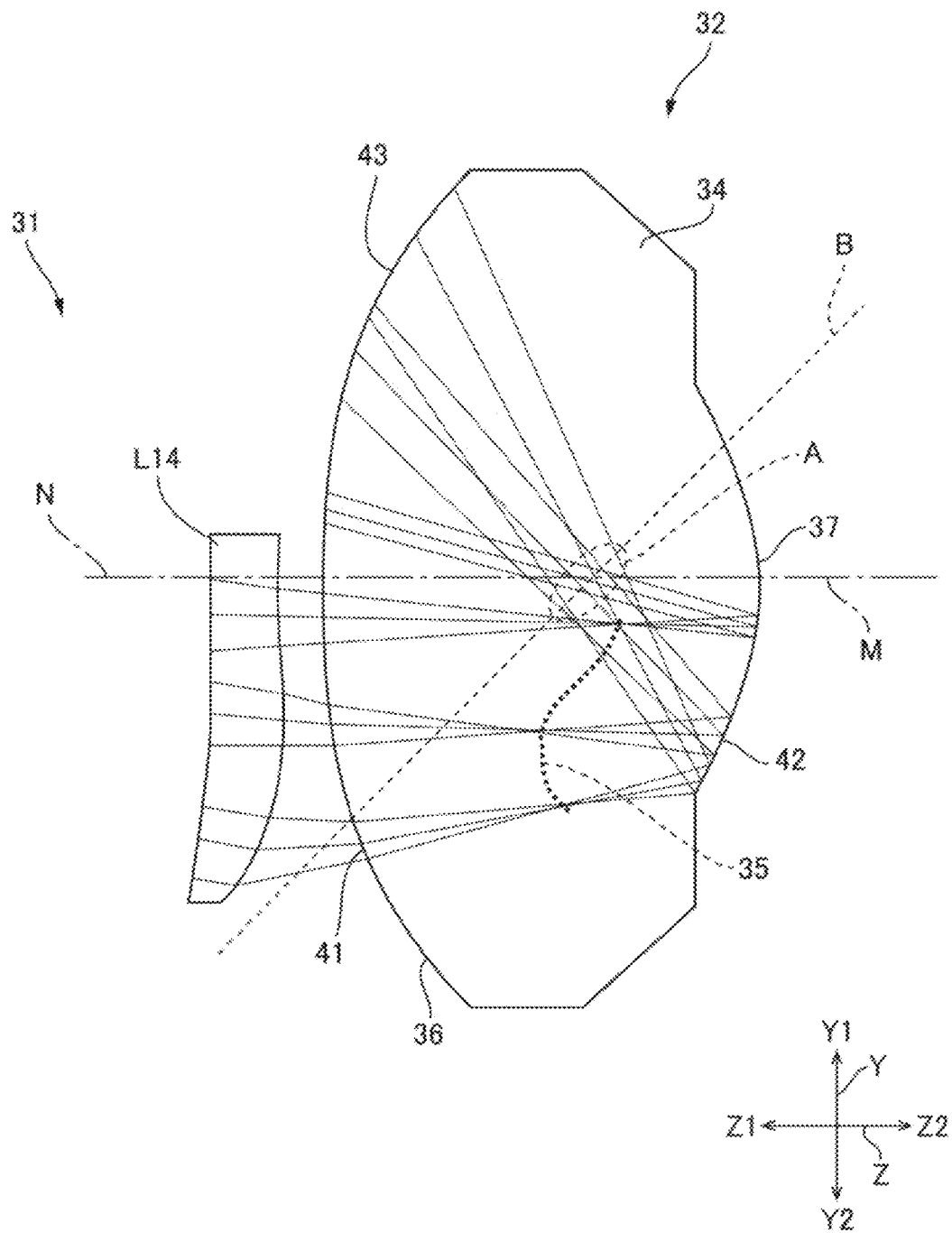
FIG. 5 is a beam diagram showing beams traveling from a lens located in a position closest to the enlargement side in a first optical system to a second optical system.

FIG. 2 is a beam diagram diagrammatically showing the entire optical system according to Example 1. FIG. 2 diagrammatically shows luminous fluxes F1 to F3, which exit out of an optical system 3A according to the present example and reach the screen S. The luminous flux F1 is a luminous flux that reaches a smallest image height position. The luminous flux F3 is a luminous flux that reaches a largest image height position. The luminous flux F2 is a luminous flux that reaches a position between the position that the luminous flux F1 reaches and the position that the luminous flux F3 reaches. FIG. 3 is a beam diagram of the optical system 3A according to Example 1. FIG. 4 is a beam diagram of the optical system 3A according to Example 1 in a case where FIG. 3 is viewed in the vertical direction. FIG. 5 is a beam diagram showing beams traveling from a lens located in a position closest to the enlargement side in a first optical system to a second optical system.

The optical system 3A according to the present example is formed of a first optical system 31 and a second optical system 32 sequentially arranged from the reduction side toward the enlargement side, as shown in FIG. 3. The second optical system 32 is disposed on an optical axis N of the first optical system 31.

In the following description, three axes perpendicular to one another are called axes X, Y, and Z for convenience. The axis Z coincides with the optical axis N of the first optical system 31. The direction along the optical axis N is an axis-Z direction. The axis-Z direction toward the side where the first optical system 31 is located is called a first direction Z1, and the axis-Z direction toward the side where the second optical system 32 is located is called a second direction Z2. The axis Y extends along the screen S. The upward-downward direction is an axis-Y direction, with one side of the axis-Y direction called an upper side Y1 and the other side of the axis-Y direction called a lower side Y2. The axis X extends in the width direction of the screen. The plane containing the axis Z and perpendicular to the axis X is called a plane YZ. The plane containing the axis Z and perpendicular to the plane YZ is called a plane XZ. FIGS. 2, 3, and 5 are each the beam diagram in the plane YZ. FIG. 4 is the beam diagram in the plane XZ.

The first optical system 31 is a refraction optical system. The first optical system 31 includes lenses L1 to L14 arranged in this order from the reduction side toward the enlargement side. In the present example, the lenses L2 and L3 are bonded to each other into a first doublet L21. The lenses L4 and L5 are bonded to each other into a second doublet L22. The lenses L9 and L10 are bonded to each other into a third doublet L23. An aperture O is disposed between the lens L7 and the lens L8.

The second optical system 32 is formed of a single lens 34. The lens 34 is made of resin. An optical axis M of the lens extends in the axis-Z direction, as shown in FIG. 3. The optical axis M of the lens 34 coincides with the optical axis N of the first optical system 31. The optical axis M of the lens therefore extends in the axis-Z direction. The second optical system 32 and the first optical system 31 share a single optical axis.

The lens 34 has a first surface 36, which faces the reduction side, and a second surface 37, which faces away from the first surface 36. The lens 34 includes a reflective coating layer at the second surface 37. The first surface 36 and the second surface 37 each have a convex shape. The lens 34 has a first transmission surface 41, a reflection surface 42, and a second transmission surface 43 sequentially arranged from the reduction side toward the enlargement side. The first transmission surface 41 is provided at the first surface 36. The first transmission surface 41 has a convex shape. The reflection surface 42 is a reflective coating layer and has a concave shape to which the surface shape of the second surface 37 is transferred. The second transmission surface 43 is provided at the first surface 36. The second transmission surface 43 has a convex shape.

The first transmission surface 41 and the reflection surface 42 are located on the lower side Y2 of the optical axis N, as shown in FIG. 5. The second transmission surface 43 is located on the upper side Y1 of the optical axis N. At least one of the first transmission surface 41, the reflection surface 42, and the second transmission surface 43 is an aspheric surface. The aspheric surface is a free-form surface in some cases.

The liquid crystal panels 18 of the image formation section 2 are disposed in the reduction-side conjugate plane of the optical system 3A. The screen S is disposed in the enlargement-side conjugate plane of the optical system 3A.

The liquid crystal panels 18 form the projection images in image formation surfaces perpendicular to the optical axis N of the first optical system 31. The liquid crystal panels 18 are disposed in positions offset from the optical axis N of the first optical axis 31 toward the upper side Y1. The projection images are therefore formed in positions offset from the optical axis N toward the upward side Y1.

The beams from the liquid crystal panels 18 pass through the first optical system 31 and the second optical system 32 in this order. Between the first optical system 31 and the second optical system 32, the beams pass through the lower side Y2 of the optical axis N. The beams are thus incident on the first transmission surface 41 of the lens 34, which forms the second optical system 32.

The beams having entered the lens 34 via the first transmission surface 41 travel through the lower side Y2 of the optical axis N toward the reflection surface 42. An intermediate image 35 conjugate to the projection images is formed between the first transmission surface 41 and the reflection surface 42.

The beams having reached the reflection surface 42 are deflected back in the first direction Z1 towards the upper side Y1. The beams deflected back by the reflection surface 42 cross the optical axis N toward the upward side Y1 and travel toward the second transmission surface 43. The beams having reached the reflection surface 42 are deflected back in the axis-X direction, as shown in FIG. 4. Therefore, in the lens 34, the beams on one side of the axis-X direction intersect the beams on the other side of the axis-X direction in a region A between the reflection surface 42 and the second transmission surface 43 and containing the optical axis M of the lens 34. As a result, the intermediate image 35 formed on the reduction side of the reflection surface 42 is so formed on the enlargement side of the reflection surface 42 that the beams on one side and the beams on the other of the axis-X direction are swapped.

In the description, the beams on one side of the axis-X direction intersect the beams on the other side of the axis-X direction in the region A between the reflection surface 42 and the second transmission surface 43 and containing the optical axis M of the lens 34. As a result, the optical density increases in the region A. A luminous flux width portion in the region A that is the portion produced at the intersection of the beams and the optical axis M of the lens 34 can be called a "pupil" of the second optical system 32.

The beams having undergone the swapping between one side and the other side of the axis-X direction exit via the second transmission surface 43 in the first direction Z1 toward the upper side Y1. The screen S is disposed on the upper side Y1 of the optical axis N. A magnified image conjugate to the intermediate image 35 is formed on the screen S.

Projection Specifications

A device, an optical axis shift, a maximum image height, an F-number, TR, a maximum projection angle, a focal length of the optical system, an amount of light, and q×FNO/f² of the optical system 3A according to the present example are listed below. The device is the dimension of the image formation surface of each of the liquid crystal panels 18. The optical axis shift is the dimension of a shift from the optical axis N to the center of the image formation surface of each of the liquid crystal panels 18. The maximum image height is a maximum image height on the image formation surface. The F-number is abbreviated to Fno. TR stands for a throw ratio that is the quotient of the division of the projection distance by the axis-X-direction dimension of a projection image projected on the screen S. The maximum projection angle is the angle between the optical axis N of the first optical system 31 and the outermost beam of the light flux F3. The focal length of the optical system is expressed by f. The amount of light is the amount of light on the screen S and is expressed by q.

| | |
|---|---|
| Device [mm × mm] | 12.8 × 8 |
| Optical axis shift [mm] | 5.6 |
| Maximum image height [mm] | 11.594 |
| Fno | 1.634 |
| TR | 0.23 |
| Maximum projection angle [deg] | 75.46 |
| f [mm] | 3.04 |
| q [lm] | 5000 |
| q × FNO/f² | 884 |

The optical system 3A according to the present example satisfies the following conditional expression.

$$10 \leq q \times Fno/f^2 \leq 2989$$

The conditional expression allows the lens 34 made of resin to be employed as the second optical system 32. The numerical formula "q×Fno/f²" contained in the conditional expression is an indicator representing the magnitude of the optical density in the region A. When the conditional expression satisfies the requirement of the upper limit, the expansion of the lens can be suppressed and the melting of the lens 34 can be avoided even when the temperature of the region A of the resin lens rises due to the increase in the optical density of the region A. Changes in the optical properties of the lens can thus be avoided or suppressed. The effect described above has been ascertained through examination using an actual resin lens.

When the conditional expression satisfies the requirement of the lower limit, the resin lens 34 can be used to readily form a magnified image having an amount of light greater than or equal to 100 lm on the screen S. The effect described above has been ascertained through examination using an actual resin lens. The appropriateness of using the numerical formula "q×Fno/f²" as an indicator representing the magnitude of the optical density in the region A will be described after the description of Examples 1 and 2 of the optical system 3.

Effects and Advantages

The optical system 3A according to the present example includes the lens having the first transmission surface 41, the reflection surface 42, and the second transmission surface 43 arranged in this order from the reduction side toward the enlargement side. The lens 34 is made of resin, and the reflection surface 42 has a concave shape. Let Fno be the F-number of the optical system 3A, f be the focal length of the optical system, and q be the amount of light in the enlargement-side conjugate plane, and the following conditional expression is satisfied.

$$10 \leq q \times Fno/f^2 \leq 2989$$

The resin lens 34 can therefore be used as the lens in the second optical system 32. When the lens 34 is made of resin, the weight of the second optical system 32 can be suppressed as compared with the case where the lens 34 is made of glass. Furthermore, for example, when a lens having an aspheric surface is manufactured, using resin as the material of the lens 34 allows suppression of the manufacturing cost of the lens 34 as compared with the case where the lens 34 is made of glass.

The lens 34 has the first surface 36 and the second surface 37 facing away from the first surface 36. The first transmission surface 41 and the second transmission surface 43 are provided at the first surface 36, and the reflection surface 42 is provided at the second surface 37. The configuration described above therefore readily allows a single lens to have the first transmission surface 41, the reflection surface 42, and the second transmission surface 43.

Furthermore, the intermediate image 35 conjugate to the enlargement-side conjugate plane is formed in the lens 34, which forms the second optical system 32. The magnification provided by the optical system is therefore readily increased as compared with an optical system that forms no intermediate image 35 therein.

In the present example, the lens 34 includes a reflective coating layer at the second surface 37, the second surface 37 has a convex shape, and the reflection surface 42 is a reflective coating layer and has a shape to which the surface shape of the second surface 37 is transferred. The lens 34 thus readily has the concave reflection surface 42.

In the present example, the second transmission surface 43 has a convex shape. The projection image can therefore be magnified by the effect of the two surfaces, the reflection surface 42 and the second transmission surface 43. The magnification provided by the optical system 3A is therefore readily increased.

Furthermore, the first transmission surface 41 can have a convex shape. The first transmission surface 41 and the second transmission surface 43 can thus be provided at the first surface 36 by using a convex shape as the shape of the first surface 36 of the lens 34. The lens 34 can therefore be easily manufactured. When the first transmission surface 41 has a convex shape, the intermediate image 35 formed on the enlargement side of the first transmission surface 41 can be reduced in size. The reflection surface 42 is thus readily reduced in size.

Furthermore, in the present example, the refractive optical system formed of a plurality of lenses is provided on the reduction side of the lens 34, which forms the second optical system 32. Occurrence of aberrations can therefore be suppressed in the first optical system 31. Occurrence of aberrations can therefore be suppressed in the entire optical system 3A.

Next, the projector 1 according to the present example includes the optical system 3A described above and the image formation section 2, which forms a projection image in the reduction-side image formation plane of the optical system 3A. The image forming section 2 includes the light source 10 and the light modulators that modulate the beams from the light source 10. In the projector according to the present example, the amount of light from the light source 10 can be set so as to fall within the range over which the optical system 3A satisfies the conditional expression.

Figure 6:
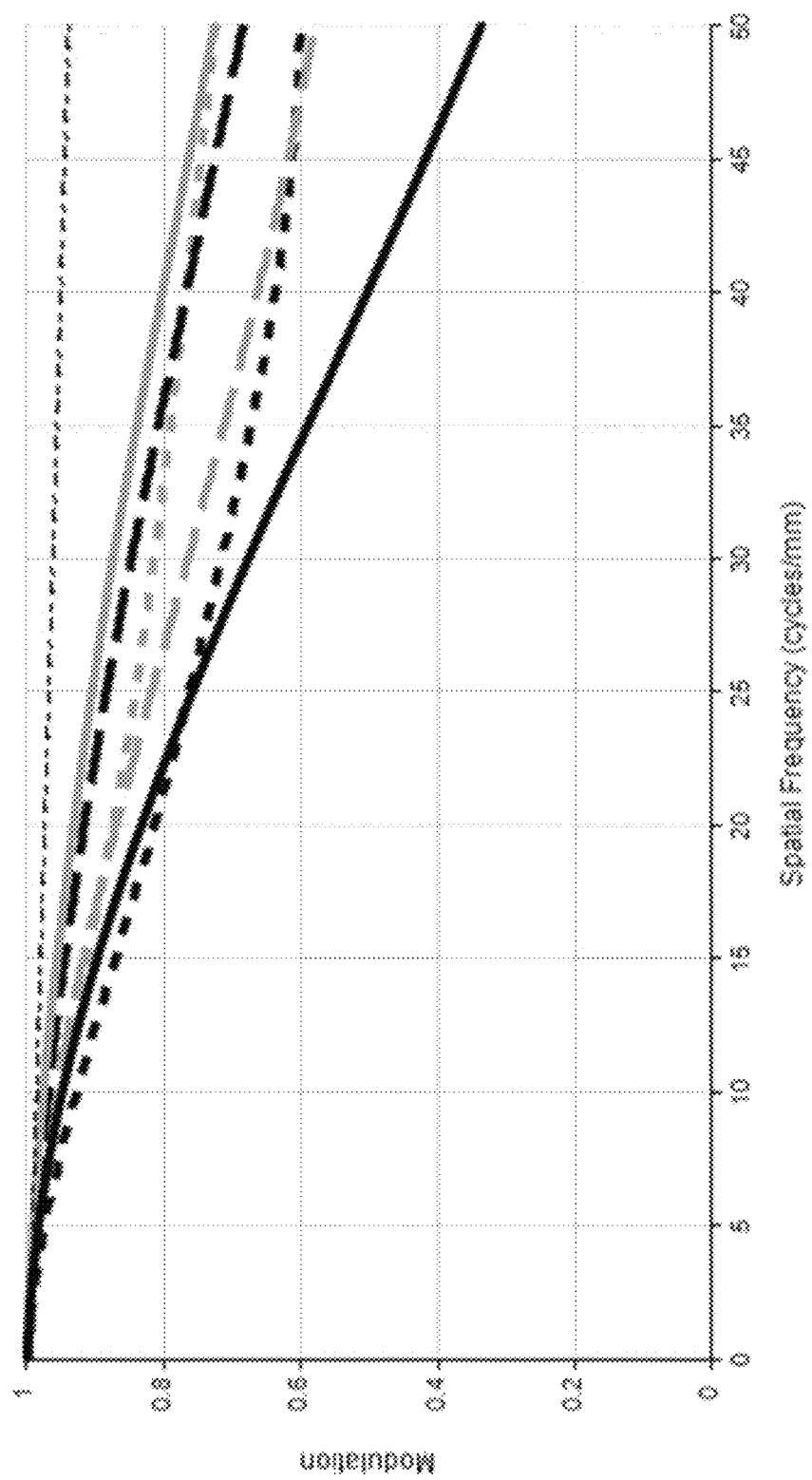
FIG. 6 shows the reduction-side MTF of the optical system according to Example 1.

FIG. 6 shows the MTF of the optical system 3A in the reduction-side conjugate plane. The horizontal axis of FIG. 6 represents the spatial frequency. The vertical axis of FIG. 6 represents a contrast reproduction ratio. In FIG. 6, the black graphs represent tangential beams (T), and the gray graphs represent radial beams (R). Out of the tangential beams (T) and the radial beams (R), the solid lines represent the light flux F1, the long-interval broken lines represent the light flux F2, and the broken lines represent the light flux F3. The optical system 3A according to the present example provides high resolution, as shown in FIG. 6.

Example 2

Figure 7:
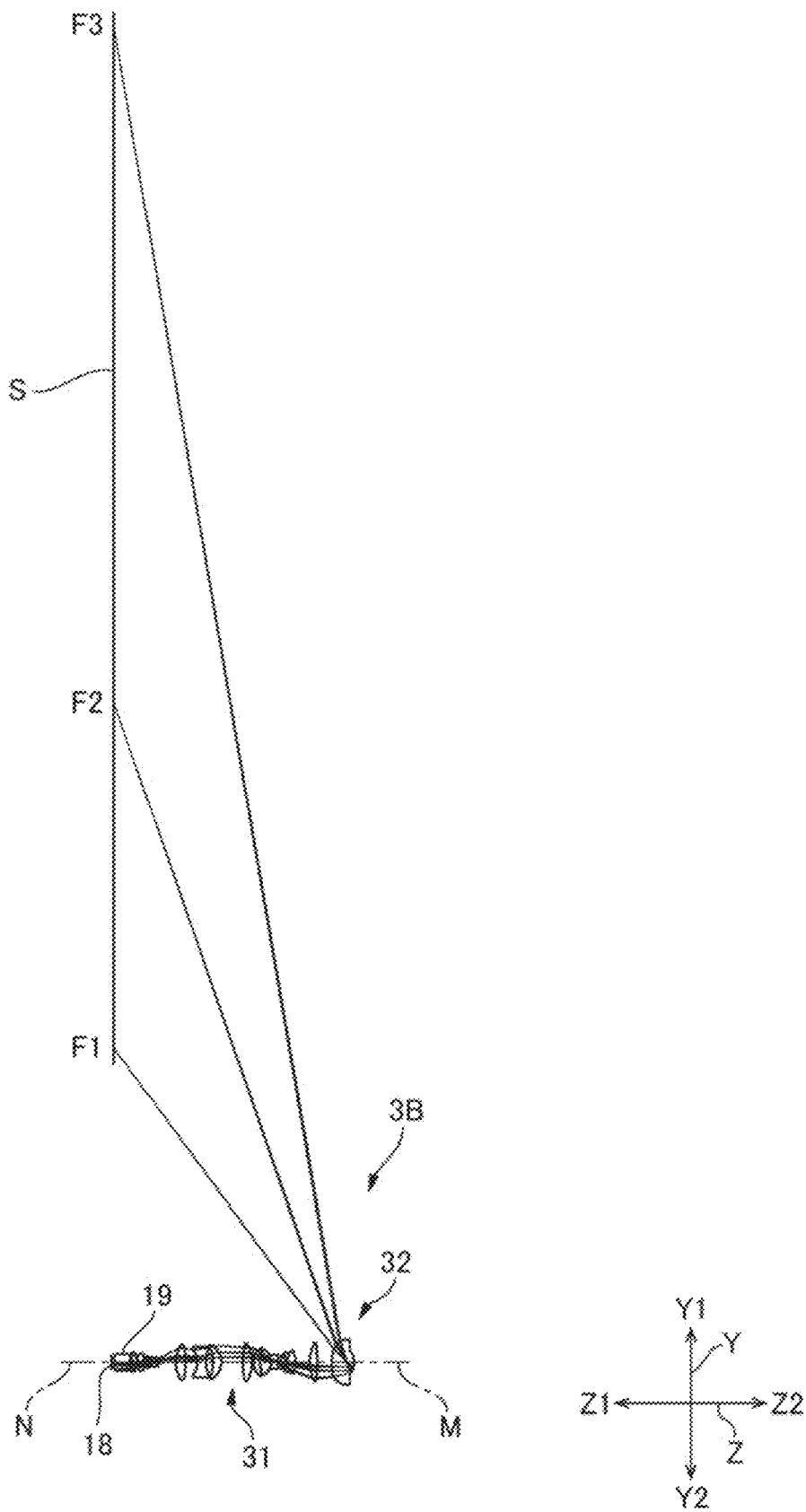
FIG. 7 is a beam diagram diagrammatically showing the entire optical system according to Example 2.
Figure 8:
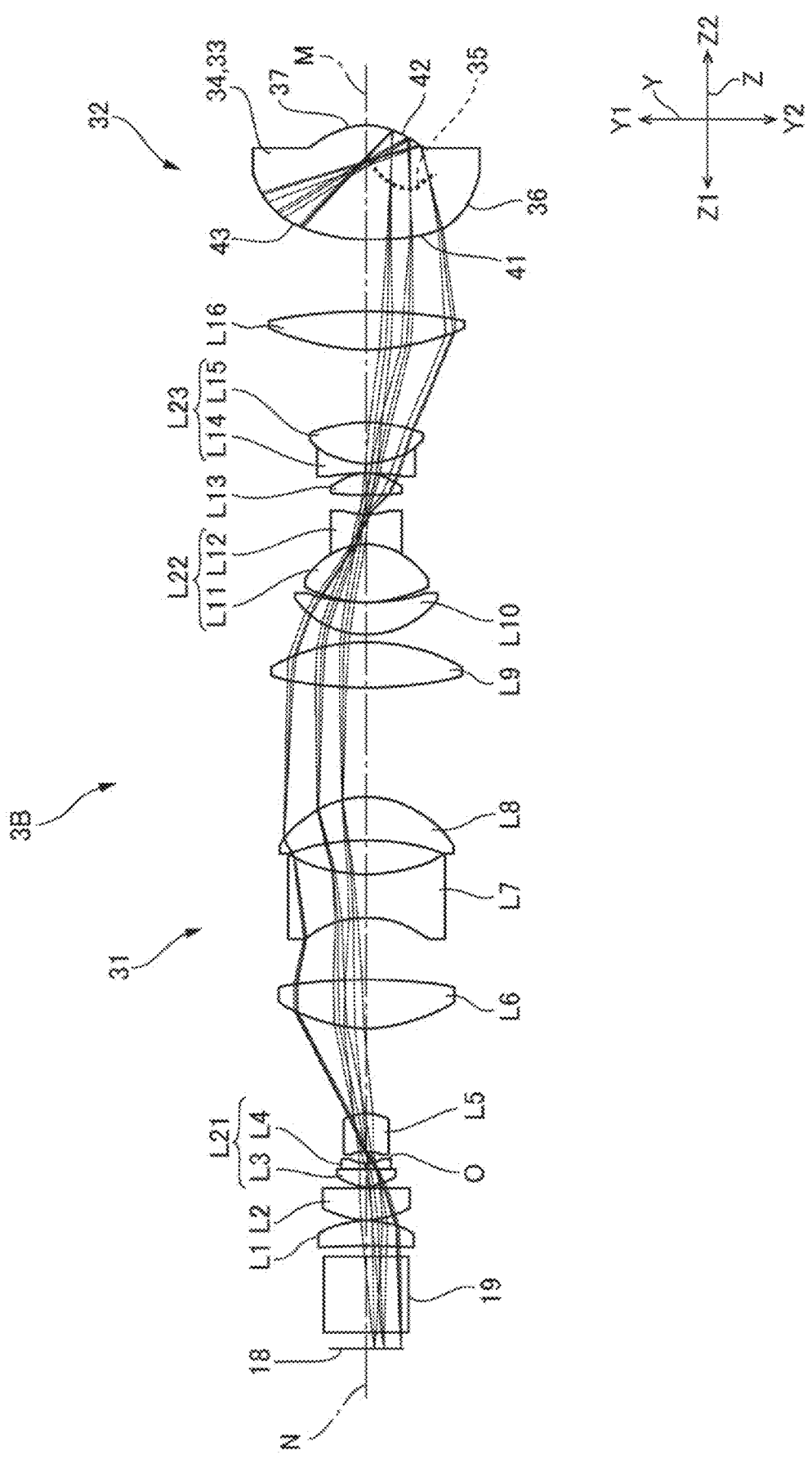
FIG. 8 is a beam diagram of the optical system according to Example 2.
Figure 9:
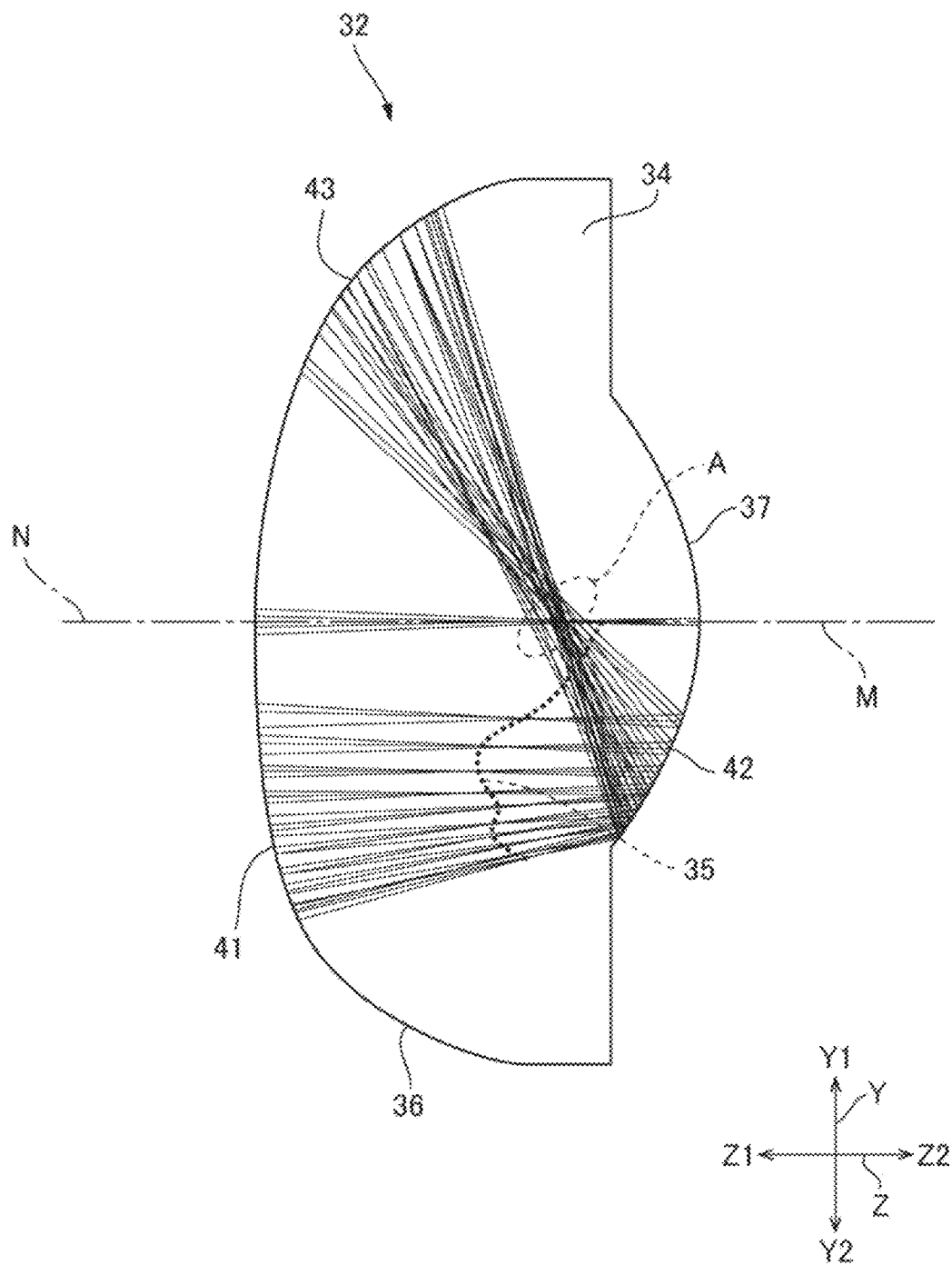
FIG. 9 is a beam diagram of the second optical system in Example 2.

FIG. 7 is a beam diagram diagrammatically showing the entire optical system according to Example 2. FIG. 7 diagrammatically shows luminous fluxes F1 to F3, which exit out of an optical system 3B according to the present example and reach the screen S. The luminous flux F1 is a luminous flux that reaches a smallest image height position. The luminous flux F3 is a luminous flux that reaches a largest image height position. The luminous flux F2 is a luminous flux that reaches a position between the position that the luminous flux F1 reaches and the position that the luminous flux F3 reaches. FIG. 8 is a beam diagram of the optical system 3B according to Example 2. FIG. 9 is a beam diagram of the second optical system.

The optical system 3B according to the present example is formed of a first optical system 31 and a second optical system 32 sequentially arranged from the reduction side toward the enlargement side, as shown in FIG. 8. The second optical system 32 is disposed on an optical axis N of the first optical system 31.

The first optical system 31 is a refraction optical system. The first optical system 31 includes lenses L1 to L16 arranged in this order from the reduction side toward the enlargement side. In the present example, the lenses L3 and L4 are bonded to each other into a first doublet L21. The lenses L11 and L12 are bonded to each other into a second doublet L22. The lenses L14 and L15 are bonded to each other into a third doublet L23. An aperture O is disposed between the lens L4 and the lens L5.

The second optical system 32 is formed of one optical element 34. The lens 34 is made of resin. An optical axis M of the lens extends in the axis-Z direction, as shown in FIG. 8. The optical axis M of the lens 34 coincides with the optical axis N of the first optical system 31. The optical axis M of the lens therefore extends in the axis-Z direction. The second optical system 32 and the first optical system 31 share a single optical axis.

The lens 34 has a first surface 36, which faces the reduction side, and a second surface 37, which faces away from the first surface 36. The lens 34 includes a reflective coating layer at the second surface 37. The first surface 36 and the second surface 37 each have a convex shape. The lens 34 has a first transmission surface 41, a reflection surface 42, and a second transmission surface 43 sequentially arranged from the reduction side toward the enlargement side. The first transmission surface 41 is provided at the first surface 36. The first transmission surface 41 has a convex shape. The reflection surface 42 is a reflective coating layer and has a concave shape to which the surface shape of the second surface 37 is transferred. The second transmission surface 43 is provided at the first surface 36. The second transmission surface 43 has a convex shape.

The first transmission surface 41 and the reflection surface 42 are located on the lower side Y2 of the optical axis N, as shown in FIG. 9. The second transmission surface 43 is located on the upper side Y1 of the optical axis N. At least one of the first transmission surface 41, the reflection surface 42, and the second transmission surface 43 is an aspheric surface. The aspheric surface is a free-form surface in some cases.

The liquid crystal panels 18 of the image formation section 2 are disposed in the reduction-side conjugate plane of the optical system 3B. The screen S is disposed in the enlargement-side conjugate plane of the optical system 3B.

The liquid crystal panels 18 form the projection images on the image formation surfaces perpendicular to the optical axis N of the first optical system 31. The liquid crystal panels 18 are disposed in positions offset from the optical axis N of the first optical axis 31 toward the lower side Y2. The projection images are therefore formed in positions offset from the optical axis N toward the lower side Y2. In the optical system 3B, a first intermediate image is formed in the first optical system 31, and a second intermediate image 35 is formed in the optical element 34 of the second optical system 32. The intermediate image 35 in the optical element 34 is then formed as the final magnified image on the screen S. Therefore, in the optical system 3B according to the present example, the intermediate image is formed three times in total. The projection images are therefore projected on the opposite side of the optical axis N from the lower side Y2, toward which the liquid crystal panels 18 are offset, so that the projection images are formed in positions offset toward the upper side Y1.

Also in Example 2, the beams from the liquid crystal panels 18 pass through the first optical system 31 and the second optical system 32 in this order. Between the first optical system 31 and the second optical system 32, the beams pass through the lower side Y2 of the optical axis N. The beams are thus incident on the first transmission surface 41 of the lens 34, which forms the second optical system 32.

The beams having entered the lens via the first transmission surface 41 travel through the lower side Y2 of the optical axis N toward the reflection surface. The intermediate image 35 conjugate to the projection images is formed between the first transmission surface 41 and the reflection surface 42.

The beams having reached the reflection surface 42 are deflected back in the first direction Z1 towards the upper side Y1. The beams deflected back by the reflection surface 42 cross the optical axis N toward the upward side Y1 and travel toward the second transmission surface 43. The beams having reached the reflection surface 42 are deflected back in the axis-X direction, as shown in FIG. 9. Therefore, in the lens 34, the beams on one side of the axis-X direction intersect the beams on the other side of the axis-X direction in a region A between the reflection surface 42 and the second transmission surface 43 and containing the optical axis M of the lens 34. As a result, the intermediate image 35 formed on the reduction side of the reflection surface 42 is so formed on the enlargement side of the reflection surface 42 that the beams on one side and the beams on the other of the axis-X direction are swapped.

In the description, the beams on one side of the axis-X direction intersect the beams on the other side of the axis-X direction in the region A between the reflection surface 42 and the second transmission surface 43 and containing the optical axis M of the lens 34. As a result, the optical density increases in the region A. A luminous flux width portion in the region A that is the portion produced at the intersection of the beams and the optical axis M of the lens 34 can be called a "pupil" of the second optical system 32.

The beams having undergone the swapping between one side and the other side of the axis-X direction exit via the second transmission surface 43 in the first direction Z1 toward the upper side Y1. The screen S is disposed on the upper side Y1 of the optical axis N. A magnified image conjugate to the intermediate image 35 is formed on the screen S.

Projection Specifications

A device, an optical axis shift, a maximum image height, an F-number, TR, a maximum projection angle, a focal length of the optical system, an amount of light, and q×FNO/f² of the optical system 3B according to the present example are listed below. The device is the dimension of the image formation surface of each of the liquid crystal panels 18. The optical axis shift is the dimension of a shift from the optical axis N to the center of the image formation surface of each of the liquid crystal panels 18. The maximum image height is a maximum image height on the image formation surface. The F-number is abbreviated to Fno. TR stands for a throw ratio that is the quotient of the division of the projection distance by the axis-X-direction dimension of a projection image projected on the screen S. The maximum projection angle is the angle between the optical axis N of the first optical system 31 and the outermost beam of the light flux F3. The focal length of the optical system is expressed by f. The amount of light is the amount of light on the screen S and is expressed by q.

| Device [mm × mm] | 12.8 × 8 |
| --- | --- |
| Optical axis shift [mm] | 5.6 |
| Maximum image height [mm] | 11.594 |
| FNO | 2.5 |
| TR | 0.14 |
| Maximum projection angle [deg] | 80.46 |
| f [mm] | 1.94 |
| q [lm] | 4500 |
| q × FNO/f² | 2989 |

The optical system according to the present example satisfies the following conditional expression.

$$10 \leq q \times Fno/f^2 \leq 2989$$

That is, q×FNO/f²=2989.

Effects and Advantages

The optical system 3B according to the present example satisfies the conditional expression. The resin lens 34 can therefore be used as the lens 34 of the second optical system 32. The optical system 3B according to the present example provides the same effects and advantages as those provided by the optical system described above.

Figure 10:
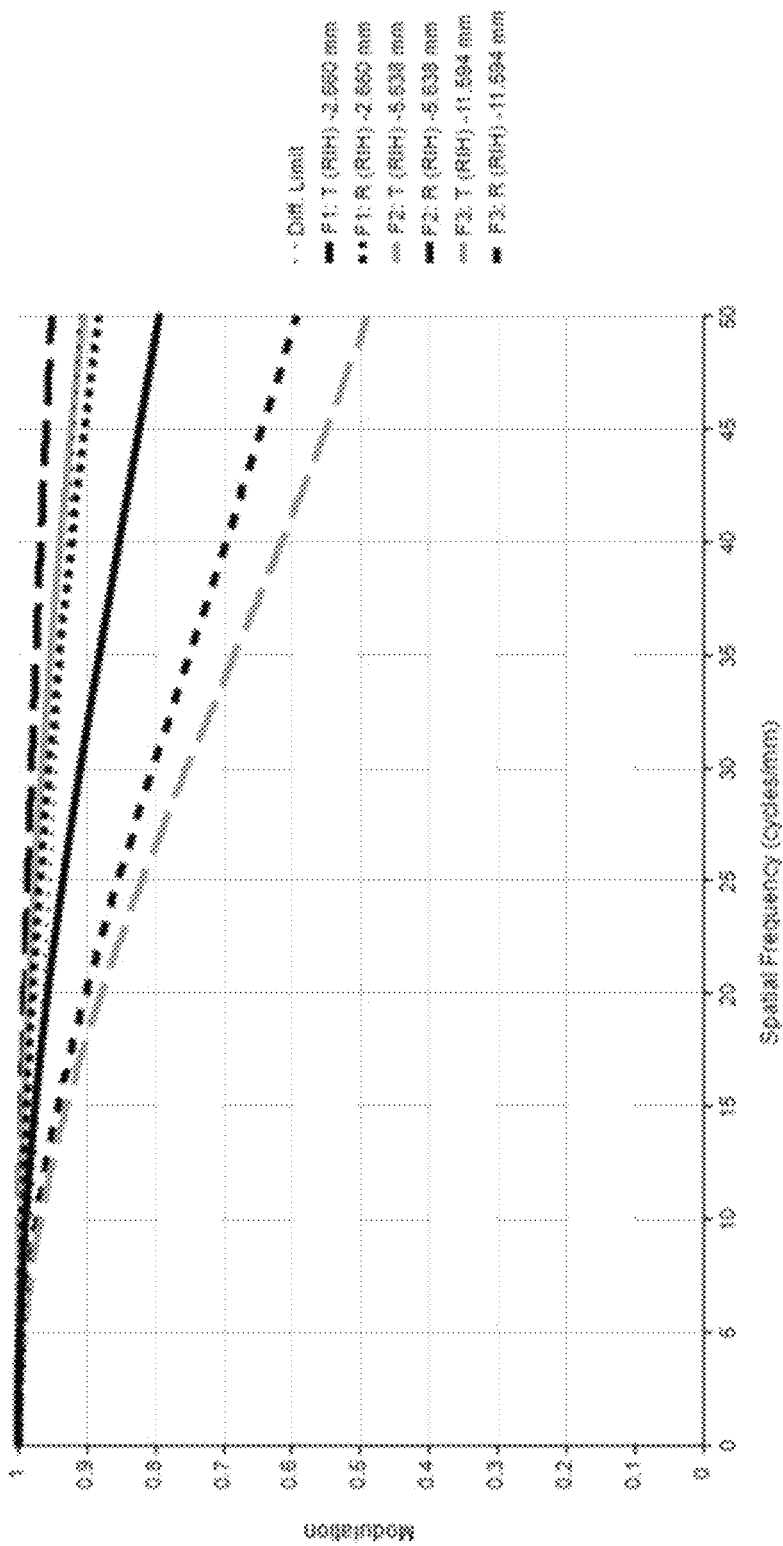
FIG. 10 shows the reduction-side MTF of the optical system according to Example 2.

FIG. 10 shows the MTF of the optical system 3B in the reduction-side conjugate plane. The horizontal axis of FIG. 10, which shows the MTF, represents the spatial frequency. The vertical axis of FIG. 10 represents the contrast reproduction ratio. In FIG. 10, the black graphs represent tangential beams (T), and the gray graphs represent radial beams (R). Out of the tangential beams (T) and the radial beams (R), the solid lines represent the light flux F1, the long-interval broken lines represent the light flux F2, and the broken lines represent the light flux F3. Even when the lens 34 is made of resin in the optical system 3B according to the present example, the optical system 3B has high resolution, as shown in FIG. 10.

Appropriateness of Numerical Formula "q×Fno/f²"

Figure 11:
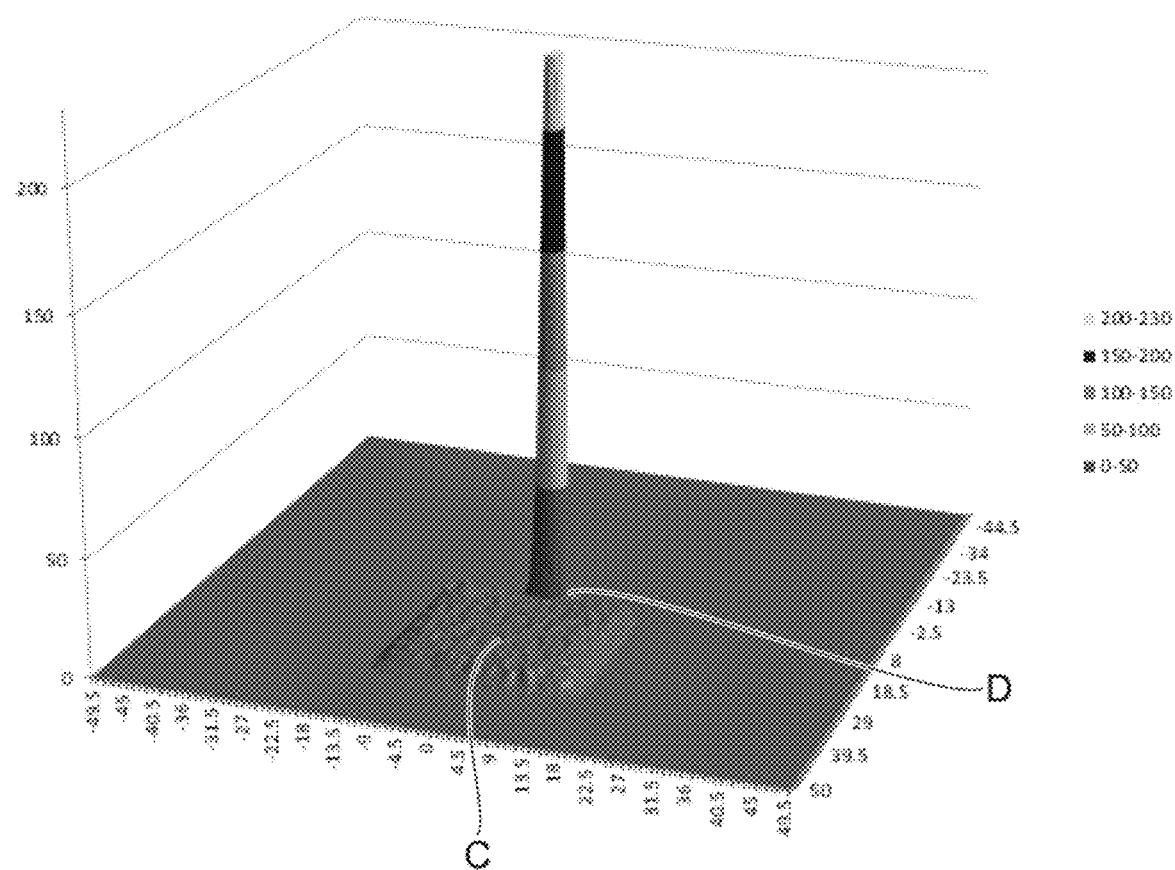
FIG. 11 is a graph showing the intensity distribution of light in an imaginary plane drawn with the dotted line in FIG. 5.
Figure 12:
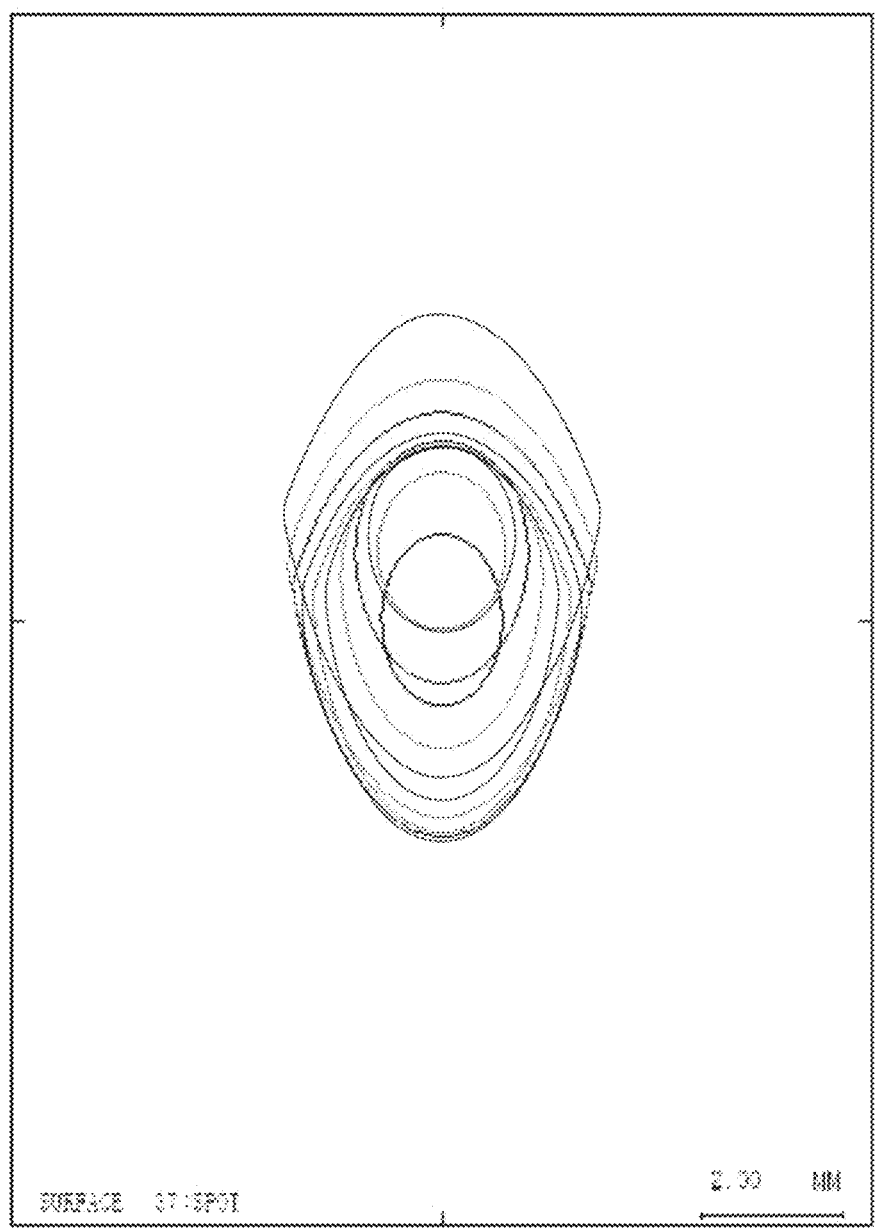
FIG. 12 is a descriptive diagram showing a passage region of the imaginary plane that is the region via which each luminous flux passes through the lens.

The appropriateness of using the numerical formula "q×Fno/f²" as the indicator representing the magnitude of the optical density in the region A will next be described with reference to FIGS. 11 to 15. FIG. 11 is a graph showing the intensity distribution of light in an imaginary plane B drawn with the dotted line in FIG. 5. FIG. 12 is a descriptive diagram showing a passage region of the imaginary plane B that is the region via which each luminous flux passes through the lens 34. The imaginary plane B is perpendicular in a position to the direction of the chief ray of the luminous flux at the center of the projection image, the position being the position where the chief ray passes through the optical axis N. The imaginary plane B passes through the region A. In the following description, the luminous flux width portion produced at the intersection of the beams and the optical axis M of the lens 34 in the imaginary plane B is called the pupil of the second optical system 32 for convenience.

In FIG. 11, the rectangular region C, which is a region shifted from the graph toward the viewer and in which the optical intensity slightly increases, is the region where the intermediate image 35 is formed. At the center of the graph, the area D, where the optical intensity is significantly high, is the pupil. The graph shown in FIG. 11 shows that the concentration of the total luminous flux in the pupil causes the optical density to be significantly high. FIG. 12 shows that each luminous flux passing through the lens passes through a relatively narrow region of the imaginary plane B.

When the size of the pupil increases, the optical density in the region A decreases, and when the size of the pupil decreases, the optical density in the region A increases. A pupil diameter E is determined by the F-number Fno and the focal length f of the optical system. The pupil diameter E relates to the F-number Fno and the focal length f as follows.

$$Fno = f/E$$

The formula for calculating the pupil diameter E is therefore as follows.

$$E = f/Fno$$

The formula for calculating the pupil diameter E shows that the pupil diameter E increases when the focal length f is increased. The formula therefore shows that increasing the focal length f can lower the optical density in the region A. The formula for calculating the pupil diameter E further shows that the pupil diameter E increases when the F-number Fno is reduced. The formula therefore shows that reducing the F-number Fno can lower the optical density in the region A. In other words, the formula shows that shortening the focal length f raises the optical density in the region A. The formula further shows that increasing the F-number Fno raises the optical density in the region A.

The optical density is simply proportional to the amount q of light having passed through the lens 34. Furthermore, the F-number Fno is simply proportional to the amount q of light formed of the beam having passed through the lens 34. In detail, the relationship between the F-number Fno and the optical density at the pupil is as follows: When the F-number Fno decreases, the pupil diameter E increases and the optical density lowers. Conversely, when the F-number Fno increases, the pupil diameter E decreases and the optical density rises, so that the F-number Fno is simply proportional to the amount of light q. On the other hand, the focal length f is inversely proportional to the optical density by the factor of the square of the focal length f. In detail, since the focal length f is expressed in a one-dimensional unit, while the cross-sectional area used to calculate the optical density is expressed in a two-dimensional unit, the focal length f is inversely proportional to the optical density by the factor of the square of the focal length f. The numerical formula "q×Fno/f²" can therefore be specified as the indicator representing the magnitude of the optical density of each luminous flux in the region A containing the pupil.

It is next examined whether a change in the focal length f correlates with a change in the pupil diameter E. Such examination of the correlation in the configuration of the optical system 3A according to Example 1 was performed under the specifications below.

| Device [mm × mm] | 12.8 × 8 |
| --- | --- |
| Amount of projection shift [%] | 70 |
| Fno | 1.634 |
| q [lm] | 5000 |

Figure 13:
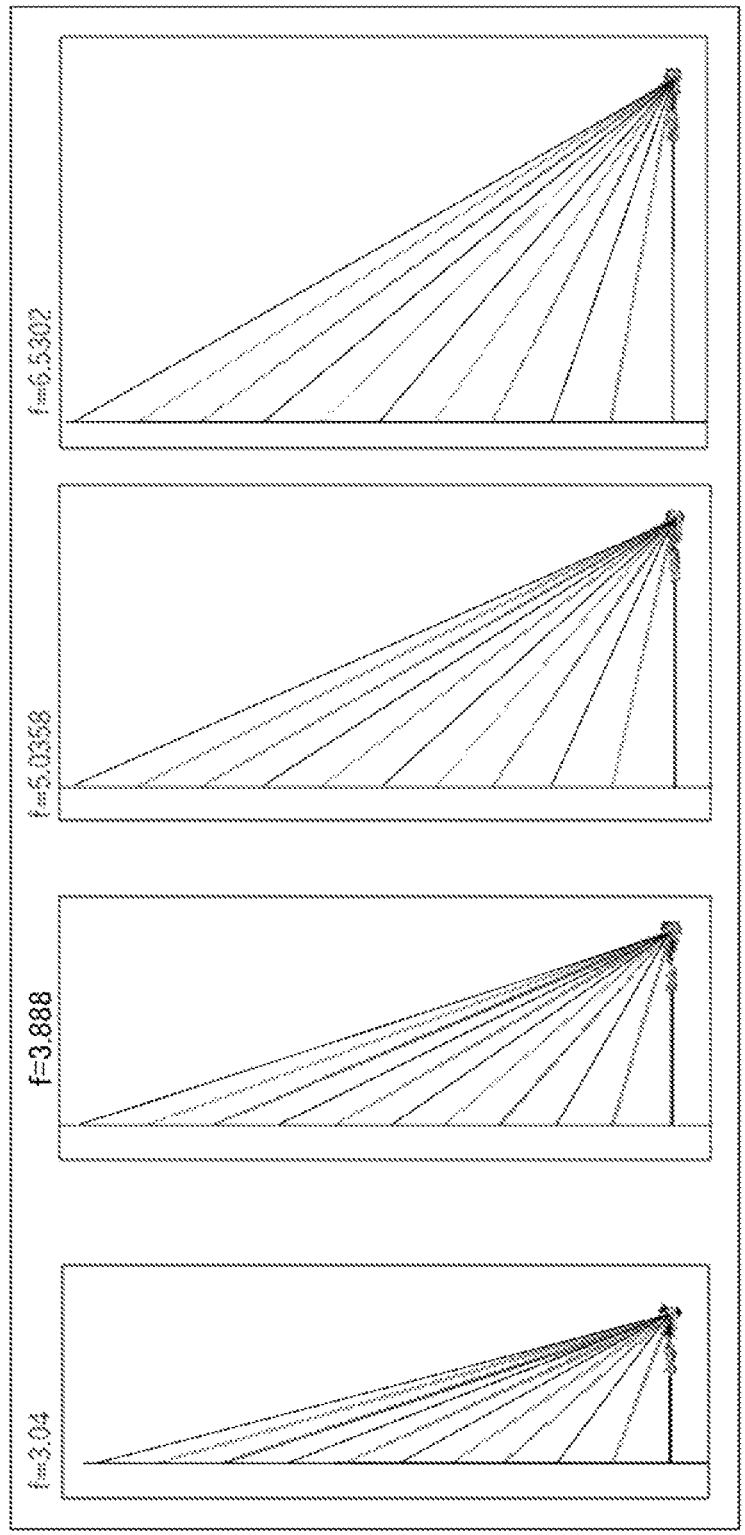
FIG. 13 is a descriptive diagram showing changes in projection status that occur when the focal length is changed.
Figure 14:
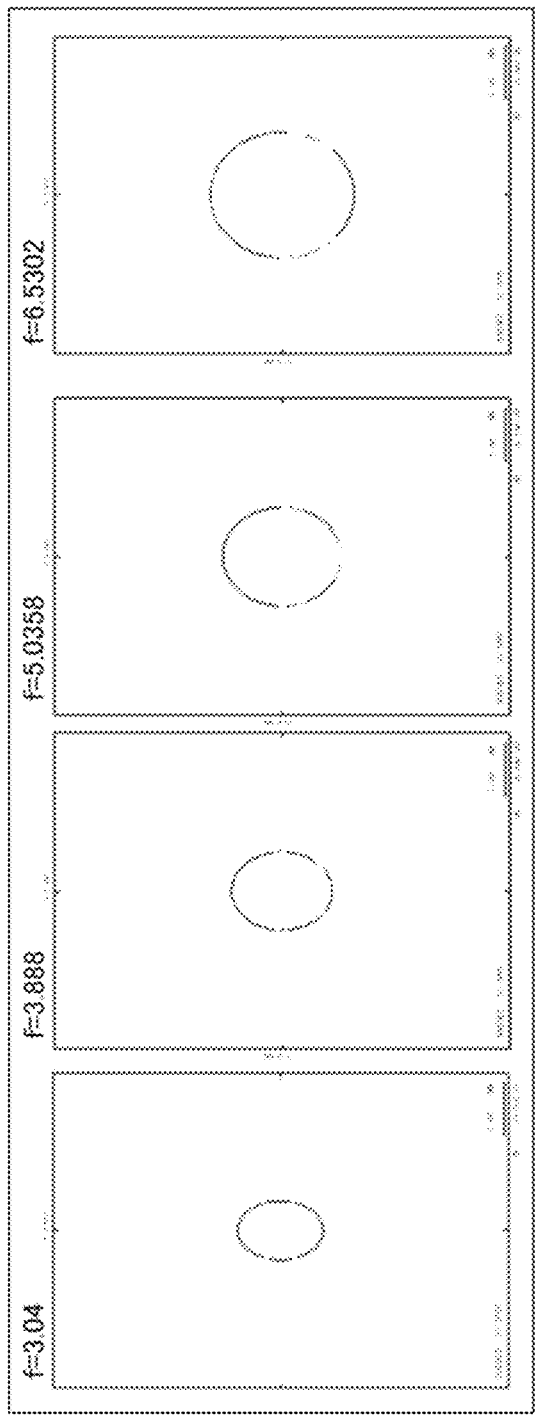
FIG. 14 is a descriptive diagram showing changes in pupil size that occur when the focal length is changed.

FIG. 13 is a descriptive diagram showing changes in the projection status that occur when the slow ratio TR is changed to change the focal length f to 3.04, 3.888, 5.036, and 6.530. FIG. 14 is a descriptive diagram showing changes in pupil size that occur when the focal length f is changed to 3.04, 3.888, 5.036, and 6.530. FIGS. 13 and 14 show that the pupil diameter E decreases as the focal length f shortens.

The area of the pupil was measured with the slow ratio TR changed. Specifically, a width W and a height T of the pupil in the imaginary plane B were measured, and "W×T/2" was defined as the area of the pupil. The width W and the height T are expressed in millimeters. The values of the focal length f, the F-number Fno, the numerical formula, the pupil width W, the pupil height T, the pupil area [W×T/2], and the optical density d that change when the slow ratio TR is changed are listed below. The symbol d represents the optical density of the beam passing through the pupil. The optical density d is expressed in lm/mm².

| TR | f | FNO | q × FNO/f² | W | T | W × T/2 | d |
|---|---|---|---|---|---|---|---|
| 0.230 | 3.040 | 1.634 | 884 | 1.71 | 2.43 | 2.08 | 2400 |
| 0.250 | 3.321 | 1.634 | 741 | 1.90 | 2.58 | 2.45 | 2038 |
| 0.273 | 3.603 | 1.634 | 629 | 2.09 | 2.74 | 2.86 | 1747 |
| 0.295 | 3.888 | 1.634 | 540 | 2.26 | 2.87 | 3.24 | 1545 |
| 0.318 | 4.173 | 1.634 | 469 | 2.42 | 3.00 | 3.62 | 1382 |
| 0.314 | 4.459 | 1.634 | 411 | 2.56 | 3.11 | 3.98 | 1257 |
| 0.363 | 4.749 | 1.634 | 362 | 2.72 | 3.26 | 4.44 | 1127 |
| 0.386 | 5.036 | 1.634 | 322 | 2.86 | 3.38 | 4.84 | 1033 |
| 0.409 | 5.322 | 1.634 | 289 | 3.01 | 3.52 | 5.29 | 945 |
| 0.432 | 5.638 | 1.634 | 257 | 3.18 | 3.68 | 5.84 | 856 |
| 0.454 | 5.898 | 1.634 | 235 | 3.32 | 3.82 | 6.34 | 789 |
| 0.477 | 6.230 | 1.634 | 210 | 3.48 | 3.96 | 6.89 | 725 |
| 0.500 | 6.530 | 1.634 | 192 | 3.63 | 4.09 | 7.42 | 674 |

Figure 15:
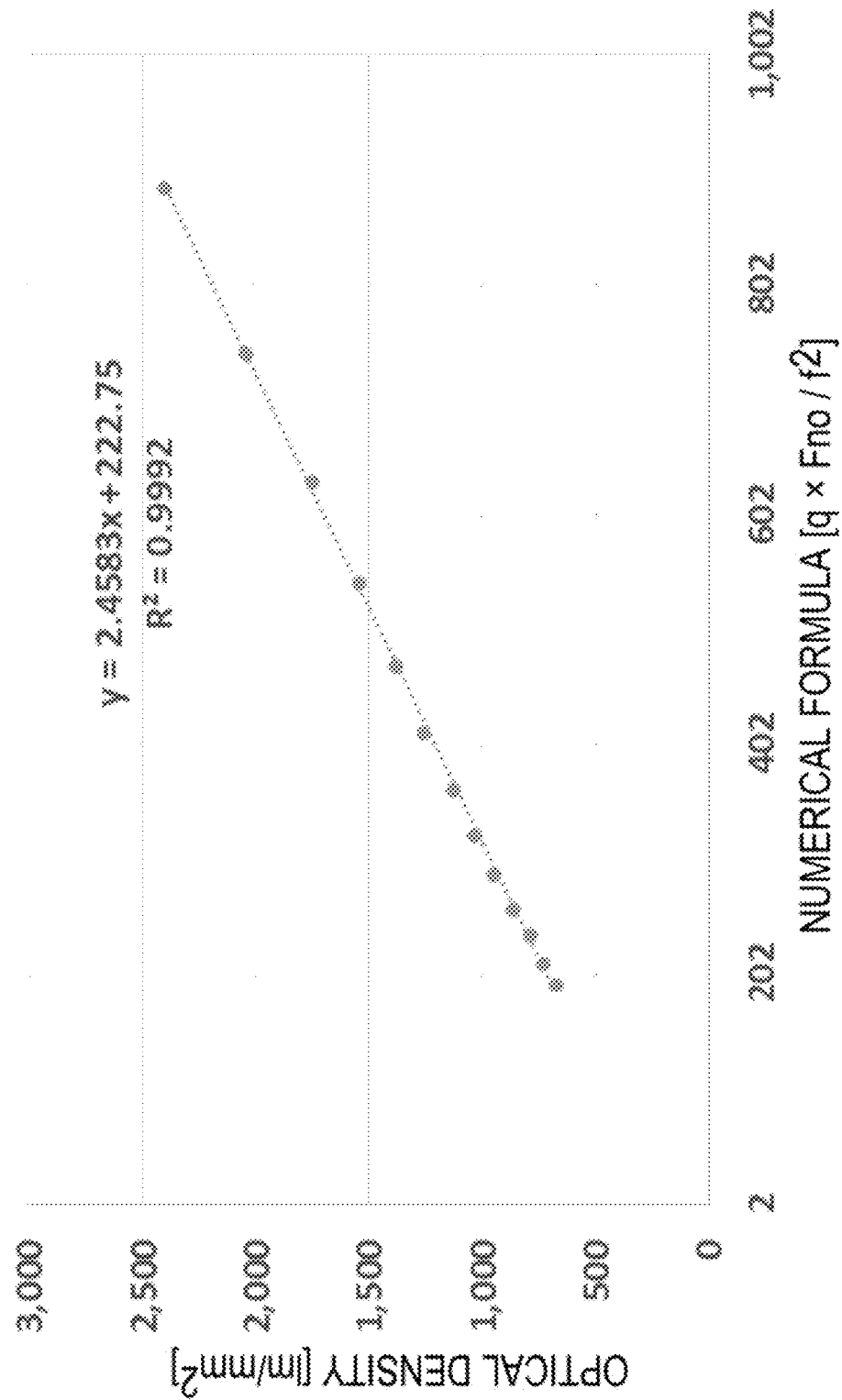
FIG. 15 is a graph showing the relationship between the value of a numerical formula "$q \times Fno/f^2$" and the optical density.

FIG. 15 is a graph showing the relationship between the value of the numerical formula "q×Fno/f²" and the optical density at the pupil based on the data described above. The graph in FIG. 15 clearly shows that the numerical formula "q×Fno/f²" highly correlates with the optical density at the pupil. It is therefore appropriate to use the numerical formula "q×Fno/f²" as the indicator representing the magnitude of the optical density in the region A containing the pupil.

The lower limit of the conditional expression is based on a case where the optical system is used under the projection specifications below.

| Device | 0.37 "16: 9 |
|---|---|
| Amount of projection shift [%] | 70 |
| Fno | 2.0 |
| TR | 0.35 |
| f [mm] | 4.45 |
| q [lm] | 100 |
| q × FNO/f² | 10.11 |

Another Example

Figure 16:
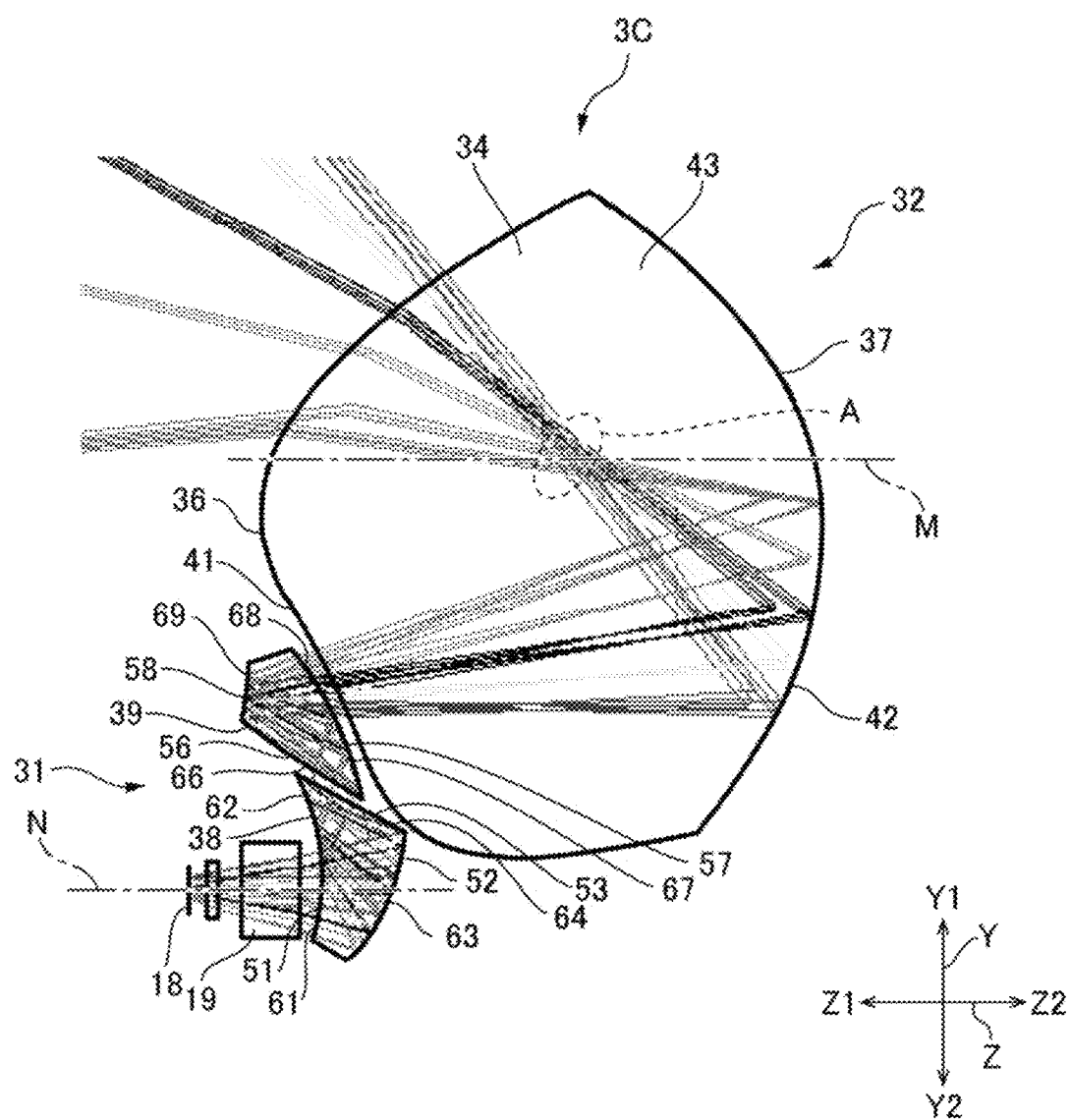
FIG. 16 is a beam diagram of the optical system according to another example.

FIG. 16 is a beam diagram of the optical system according to another example. An optical system 3C according to the present example has configurations corresponding to those of the optical systems described above. The corresponding configurations therefore have the same reference characters and will not be described.

The optical system 3C according to the present example is formed of a first optical system 31 and a second optical system 32 sequentially arranged from the reduction side toward the enlargement side, as shown in FIG. 16. The first optical system 31 includes a first optical element 38 and a second optical element 39 arranged from the reduction side toward the enlargement side.

In the description of the present example, three axes perpendicular to one another are called axes X, Y, and Z for convenience. The direction in which the first optical element 38 and the deflection member 39 are arranged is called an axis-Y direction. The direction in which the liquid crystal panels 18 and the second optical element 39 are arranged is called an axis-Z direction. The axis-Y direction toward the side where first optical element 38 is located is called a direction Y2, and the axis-Y direction toward the side where the second optical element 39 is located is called a direction Y1. The axis-Z direction toward the side where liquid crystal panels are located is called a direction Z1, and the axis-Z direction toward the side where the first optical element 38 is located is called a direction Z2.

The first optical element 38 has a first surface 51 facing in the direction Z1, a second surface 52 facing away from the first surface 51, and a third surface 53 facing in the direction Y1. The first optical element 38 includes a first reflective coating layer at a portion of the first surface 51 that is a portion shifted in the direction Y1. The first optical element 38 further includes a second reflective coating layer at the second surface 52. Therefore, a portion of the first surface 51 that is a portion shifted in the direction Y2 forms a light incident surface 61, and a portion of the first surface 51 that is a portion shifted in the direction Y1 forms a first reflection surface 62. The second surface 52 forms a second reflection surface 63. The third surface 53 forms a light exiting surface 64. Beams that pass through the first optical element 38 from the reduction side toward the enlargement side travels via the light incident surface 61, the second reflection surface 63, the first reflection surface 62, and the light exiting surface 64 in this order. In detail, the beams having entered the first optical element 38 in the direction Z2 are refracted at the light incident surface 61, are then reflected off the first reflection surface 63, return in the direction Z1, and are incident on the second reflection surface 62 at angles greater than the total reflection angle, so that the beams are totally reflected off the second reflection surface 62 and exit via the light exiting surface 64.

The second optical element 39 has a first surface 56 facing the first optical element 38, a second surface 57 facing the second optical element 32, and a third surface 58 facing away from the second surface 57. The second optical element 39 includes a first reflective coating layer at a portion of the second surface 57 that is a portion shifted in the direction Y2. The second optical element 39 further includes a second reflective coating layer at the third surface 58. The first surface 56 therefore forms a light incident surface 66. A portion of the second surface 57 that is a portion shifted in the direction Y2 forms a first reflection surface 67, and a portion of the second surface 57 that is a portion shifted in the direction Y1 forms a light exiting surface 68. The third surface 58 forms a second reflection surface 69. The beams that pass through the second optical element 39 from the reduction side toward the enlargement side travel via the light incident surface 66, the first reflection surface 67, the second reflection surface 69, and the light exiting surface 68 in this order. In detail, the light incident via the light incident surface 66 of the first surface 56 is incident on the second surface 57 at an angle greater than the total reflection angle, so that the light is totally reflected off the first reflection surface 67 and travels toward the third surface 58. The beams reflected off the first reflection surface 67 are reflected again off the second reflection surface 69 and exit via the light exiting surface 68 of the second surface 57 toward the second optical system 32.

The second optical system 32 is formed of one lens 34. The lens 34 is disposed in a position shifted in the direction Z2 from the second optical element 39. The lens 34 has a first surface 36 facing in the direction Z1 and a second surface 37 facing in the direction Z2. The first surface 36 and the second surface 37 each have a convex shape. An optical axis M of the lens 34 extends in the axis-Z direction.

The lens 34 has a first transmission surface 41, a reflection surface 42, and a second transmission surface 43 sequentially arranged from the reduction side. The first transmission surface 41 is provided at the first surface 36. The first transmission surface 41 therefore has a convex shape. The reflection surface 42 is a reflective coating layer provided on the second surface 37 of the lens 34. The reflection surface 42 therefore has a concave shape to which the surface shape of the second surface 37 is transferred. The optical axis of the reflection surface 42 coincides with the optical axis M of the lens 34. The first transmission surface 41 and the reflection surface 42 are arranged in the axis-Z direction. The first transmission surface 41 and the reflection surface 42 are located on the lower side Y2 of the optical axis of the lens 34. The second transmission surface 43 is provided at the first surface 36. The second transmission surface 43 therefore has a convex shape. The first transmission surface 41 and the second transmission surface are arranged in the axis-Y direction. The second transmission surface 43 is located in a position shifted in the direction Y1 from the optical axis M of the lens 34.

The beams from the liquid crystal panels 18 pass through the first optical system 31 and the second optical system 32 in this order. Between the first optical system 31 and the second optical system 32, the beams pass through the lower side Y2 of the optical axis M of the lens 34. The beams are thus incident on the first transmission surface 41 of the lens 34, which forms the second optical system 32.

The beams having entered the lens via the first transmission surface 41 travel through the lower side Y2 of the optical axis M toward the reflection surface 42. An intermediate image conjugate to a projection image is formed between the first transmission surface and the reflection surface.

The beams are then deflected back by the reflection surface 42 towards the upper side Y1 in the first direction Z1. The beams deflected back by the reflection surface 42 cross the optical axis M toward the upward side Y1 and travel toward the second transmissive surface 43. The beams are further deflected back by the reflection surface 42 in the axis-X direction, as shown in FIG. 4. Therefore, in the lens 34, the beams on one side of the axis-X direction intersect the beams on the other side of the axis-X direction in a region A between the reflection surface 42 and the second transmission surface 43 and containing the optical axis of the lens. As a result, the intermediate image formed on the reduction side of the reflection surface 42 is so formed on the enlargement side of the reflection surface 42 that the beams on one side and the beams on the other of the axis-X direction are swapped. In the description, the beams on one side of the axis-X direction intersect the beams on the other side of the axis-X direction in the region A between the reflection surface 42 and the second transmission surface 43 and containing the optical axis M of the lens 34. As a result, the light density increases. A luminous flux width portion produced at the intersection of the beams and the optical axis M of the lens 34 in the region A can be called the pupil of the second optical system 32.

The beams having undergone the swapping between one side and the other side of the axis-X direction exit via the second transmission surface 43 in the first direction Z1 toward the upper side Y1. The screen S is disposed on the upper side Y1 of the optical axis N. A magnified image conjugate to the intermediate image is formed on the screen S.

Effects and Advantages

Also in the optical system 3C according to the present example, the second optical system 32 includes the lens 34 having the first transmission surface 41, the reflection surface 42, and the second transmission surface 43 sequentially arranged from the reduction side toward the enlargement side. The lens 34 is made of resin, and the reflection surface 42 has a concave shape. Let Fno be the F-number of the optical system 3C, f be the focal length of the optical system 3C, and q be the amount of light at the enlargement-side conjugate plane, the conditional expression below is satisfied.

$$10 \leq q \times Fno/f^2 \leq 2989$$

The resin lens 34 can therefore be used as the lens 34 of the second optical system 32. When the lens 34 is made of resin, the weight of the second optical system 32 can be suppressed as compared with the case where the lens 34 is made of glass. Furthermore, for example, when the lens 34 having an aspheric surface is manufactured, using resin as the material of the lens 34 allows suppression of the manufacturing cost of the lens 34 as compared with the case where the lens 34 is made of glass.

Variation of Projector

Figure 17:
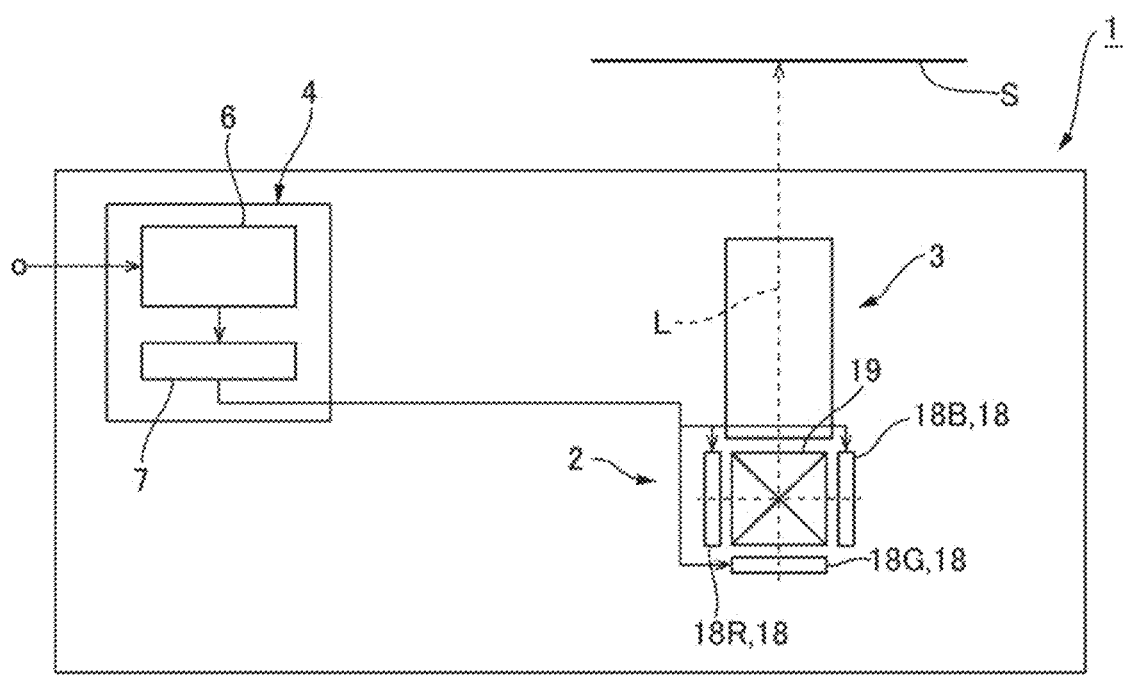
FIG. 17 is a schematic configuration diagram of a variation of the projector including the optical system.

FIG. 17 is a schematic configuration diagram of a variation of the projector including the optical system 3 according to the present disclosure. The projector according to the present example has configurations corresponding to those of the projector described above. The corresponding configurations therefore have the same reference characters and will not be described.

A projector 1 includes an image formation section 2, which generates a projection image to be projected on a screen S, an optical system 3, which magnifies the projection image and projects the magnified image on the screen S, and a controller 4, which controls the operation of the image formation section 2, as shown in FIG. 17.

In the projector 1 according to the present example, the image formation section 2 includes liquid crystal panels 18 and a cross dichroic prism 19. The liquid crystal panels 18 in the present example are each self-luminous and each form a projection image. The liquid crystal panels 18 include a liquid crystal panel 18R, a liquid crystal panel 18G, and a liquid crystal panel 18B.

In the projector 1 according to the present example, since the liquid crystal panels 18 in the present example are self-luminous, the image formation section 2 has no light source or illumination optical system. Therefore, as compared with the case where the image formation section 2 includes a light source and an illumination optical system, the image formation section 2 in the present example has no light source or illumination optical system and therefore allows the projector 1 to be compact.

Imaging Apparatus

FIG. 18 is a descriptive diagram of an imaging apparatus 5 including the optical system 3 that employs the lens 34 in the present example. The imaging apparatus 5 according to the present example employs the aforementioned optical system 3 used in the projector. In the imaging apparatus 5, an imager 8 is disposed in a reduction-side image formation plane 100 of the optical system 3.

In the imaging apparatus 5 according to the present example, the optical system 3 includes the lens 34 having the first transmission surface 41, the reflection surface 42, and the second transmission surface 43 sequentially arranged from the reduction side toward the enlargement side. The lens 34 is made of resin, and the reflection surface 42 has a concave shape. Let Fno be the F-number of the optical system 3, f be the focal length of the optical system 3, and q be the amount of light at an enlargement-side conjugate plane 200, the following conditional expression is satisfied.

$$10 \leq q \times Fno/f^2 \leq 2989$$

Therefore, even when a subject has the amount of light q, the resin lens 34 can be used as the lens 34 of the second optical system 32.

What is claimed is:

1. An optical system comprising
a lens having a first transmission surface, a reflection surface disposed on an enlargement side of the first transmission surface, and a second transmission surface disposed on the enlargement side of the reflection surface,
wherein the lens is made of resin,
the reflection surface has a concave shape, and $$10 \leq q \times Fno/f^2 \leq 2989$$

where Fno is an F-number of the optical system, f is a focal length of the optical system, and q is an amount of light in an enlargement-side conjugate plane.

2. The optical system according to claim 1,
wherein the lens has a first surface and a second surface facing an opposite side to the first surface,
the first transmission surface and the second transmission surface are provided at the first surface, and
the reflection surface is provided at the second surface.

3. The optical system according to claim 2,
wherein the second surface has a convex shape,
the second surface is provided with a reflective coating layer that is the reflection surface, and
the reflective coating layer has a shape to which a surface shape of the second surface is transferred.

4. The optical system according to claim 1,
wherein an intermediate image conjugate to the enlargement-side conjugate plane is formed in the lens.

5. The optical system according to claim 1,
wherein the second transmission surface has a convex shape.

6. The optical system according to claim 1,
wherein the first transmission surface has a convex shape.

7. The optical system according to claim 1, further comprising
a refraction optical system disposed on a reduction side of the lens.

8. A projector comprising:
a light modulator that modulates light emitted from a light source; and
the optical system according to claim 1 that projects the light modulated by the light modulator.

9. A projector comprising:
a self-luminous image display device that emits light to form an image; and
the optical system according to claim 1 that projects the image formed by the self-luminous image display device.

10. An imaging apparatus comprising:
the optical system according to claim 1; and
an imager disposed in a reduction-side conjugate plane where light emitted from the optical system is imaged.

\* \* \* \* \*